(12) United States Patent
Yamamoto et al.

(10) Patent No.: US 11,432,321 B2
(45) Date of Patent: Aug. 30, 2022

(54) BASE STATION, TERMINAL, AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 70 days.

(21) Appl. No.: 16/958,052

(22) PCT Filed: Jan. 12, 2018

(86) PCT No.: PCT/CN2018/072458
§ 371 (c)(1),
(2) Date: Jun. 25, 2020

(87) PCT Pub. No.: WO2019/136709
PCT Pub. Date: Jul. 18, 2019

(65) Prior Publication Data
US 2021/0068148 A1    Mar. 4, 2021

(51) Int. Cl.
*H04W 4/00* (2018.01)
*H04W 74/00* (2009.01)
(Continued)

(52) U.S. Cl.
CPC ......... *H04W 74/006* (2013.01); *H04L 5/0055* (2013.01); *H04W 72/0453* (2013.01); *H04W 74/0833* (2013.01)

(58) Field of Classification Search
CPC ........... H04W 74/006; H04W 72/0453; H04W 74/0833; H04W 72/1284; H04W 74/004;
(Continued)

(56) References Cited

U.S. PATENT DOCUMENTS

| 2018/0098361 A1* | 4/2018 | Ji ........................... H04L 5/0092 |
| 2018/0324773 A1* | 11/2018 | Fu ......................... H04L 5/0094 |

(Continued)

FOREIGN PATENT DOCUMENTS

| WO | WO 2016129755 A1 | 8/2016 |
| WO | WO 2017111987 A1 | 6/2017 |

(Continued)

OTHER PUBLICATIONS

NEC, "Resource allocation for NR PUCCH", R1-1720380, Nov. 27-Dec. 1, 2017 (From Applicant's IDS) (Year: 2017).*

(Continued)

*Primary Examiner* — Mang Hang Yeung
(74) *Attorney, Agent, or Firm* — Seed IP Law Group LLP

(57) ABSTRACT

In a base station (100), a controller (101) determines one set from among a plurality of sets, each of which including one or more candidates for a resource for an uplink (UL) control channel during initial access, and determines one candidate from among the one or more candidates for the resource, which is included in the determined set. A transmitter (114) indicates the determined set to a terminal (200) by higher layer signaling, and indicates the determined candidate by dynamic signaling. A receiver (116) receives a UL control signal, using the resource corresponding to the determined candidate in the determined set. In the base station, the association between a value to be indicated by the higher layer signaling and the plurality of sets is configured for each of one or more parameters relating to the initial access.

16 Claims, 26 Drawing Sheets

(51) Int. Cl.
*H04L 5/00* (2006.01)
*H04W 72/04* (2009.01)
*H04W 74/08* (2009.01)

(58) Field of Classification Search
CPC ... H04L 5/0055; H04L 1/1861; H04L 5/0094; H04L 5/0053
USPC .......................................................... 370/329
See application file for complete search history.

(56) References Cited

U.S. PATENT DOCUMENTS

| | | | |
|---|---|---|---|
| 2019/0124645 A1* | 4/2019 | Huang | H04W 72/0446 |
| 2019/0132861 A1* | 5/2019 | Koorapaty | H04L 1/1887 |
| 2020/0323031 A1* | 10/2020 | Nakamura | H04W 72/042 |

FOREIGN PATENT DOCUMENTS

| | | |
|---|---|---|
| WO | WO 2017196083 A1 | 11/2017 |
| WO | 2019/098019 A1 | 5/2019 |

OTHER PUBLICATIONS

Panasonic, "Discussion on resource allocation for uplink control channel", R1-1720450, Nov. 27-Dec. 1, 2017 (From Applicant's IDS) (Year: 2017).*

3GPP TS 38.211 V2.0.0, "3rd Generation Partnership Project; Technical Specification Group Radio Access Network; NR; Physical channels and modulation (Release 15)," Dec. 2017, 73 pages.

3GPP TS 38.212 V2.0.0, "3rd Generation Partnership Project; Technical Specification Group Radio Access Network; NR; Multiplexing and channel coding (Release 15)," Dec. 2017, 82 pages.

3GPP TS 38.213 V2.0.0, "3rd Generation Partnership Project; Technical Specification Group Radio Access Network; NR; Physical layer procedures for control (Release 15)," Dec. 2017, 56 pages.

Chairman, "Draft Agenda," R1-1719300, 3GPP TSG RAN WG1 Meeting 91, Reno, USA, Nov. 27-Dec. 1, 2017, 8 pages.

International Search Report, dated Sep. 28, 2018, for corresponding International Application No. PCT/CN2018/072458, 2 pages.

Oppo, "Summary of offline discussion on PUCCH resource allocation," R1-1721619, Agenda Item: 7.3.2.4, 3GPP TSG RAN WG1 Meeting 91, Reno, USA, Nov. 27-Dec. 1, 2017, 9 pages.

Qualcomm Incorporated, "Resource allocation for PUCCH," R1-1720686, Agenda Item: 7.3.2.4, 3GPP TSG RAN WG1 Meeting #91, Reno, US, Nov. 27-Dec. 1, 2017, 14 pages.

Samsung, "Resource Allocation for PUCCH transmission," R1-1717655, Agenda Item: 7.3.2.4, 3GPP TSG RAN WG1 Meeting 90bis, Prague, CZ, Oct. 9-13, 2017, 4 pages.

Extended European Search Report dated Dec. 4, 2020 for the corresponding European Patent Application No. 18899886.8, 13 pages.

NEC, "Resource allocation for NR PUCCH", R1-1720380, Agenda Item: 7.3.2.4, 3GPP TSG RAN WG1 Meeting #91, Reno, Nevada, Nov. 27-Dec. 1, 2017, , 8 pages.

Panasonic, "Discussion on resource allocation for uplink control channel", R1-1720451, Agenda Item: 7.3.2.4, 3GPP TSG RAN WG1 Meeting #91, Reno, USA, Nov. 27-Dec. 1, 2017, 9 pages.

Indian Office Action, dated Jun. 6, 2022, for Indian Patent Application No. 202027025880 (7 pages).

NEC, "Frequency hopping schemes for NR UL PUSCH," R1-1720900, Agenda Item: 7.3.3.4, 3GPP TSG RAN WG1 Meeting #91, Reno, Nevada, US, Nov. 27-Dec. 1, 2017 (5 pages).

* cited by examiner

4bits in RMSI to PUCCH resource set mapping

| Index in RMSI | PUCCH resource set |
|---|---|
| 0 (0000) | Set (0) |
| 1 (0001) | Set (1) |
| 2 (0010) | Set (2) |
| 3 (0011) | Set (3) |
| 4 (0100) | Set (4) |
| 5 (0101) | Set (5) |
| 6 (0110) | Set (6) |
| 7 (0111) | Set (7) |
| 8 (1000) | Set (8) |
| 9 (1001) | Set (9) |
| 10 (1010) | Set (10) |
| 11 (1011) | Set (11) |
| 12 (1100) | Set (12) |
| 13 (1101) | Set (13) |
| 14 (1110) | Set (14) |
| 15 (1111) | Set (15) |

FIG. 6A

PUCCH resource set (n)

| DCI (PUCCH resource indicator) | PUCCH resource |
|---|---|
| 0 (00) | PUCCH resource (n, 0) |
| 1 (01) | PUCCH resource (n, 1) |
| 2 (10) | PUCCH resource (n, 2) |
| 3 (11) | PUCCH resource (n, 3) |

FIG. 6B

PUCCH resource (n, x)

| PUCCH Format | 0 or 1 |
|---|---|
| Starting Symbol | A(n, x) |
| Number of Symbols | B(n, x) |
| PRB index for 1st hop | C(n, x) |
| PRB index for 2nd hop | D(n, x) |
| Frequency hopping | On or off |
| Cyclic shift | E(n, x) |
| Time domain OCC | F(n, x) |

FIG. 6C

4bits in RMSI to PUCCH resource set mapping

| Index in RMSI | PUCCH resource set for PUCCH Format 0 | PUCCH resource set for PUCCH Format 1 |
|---|---|---|
| 0 (0000) | Set (0, 0) | Set (1, 0) |
| 1 (0001) | Set (0, 1) | Set (1, 1) |
| 2 (0010) | Set (0, 2) | Set (1, 2) |
| 3 (0011) | Set (0, 3) | Set (1, 3) |
| 4 (0100) | Set (0, 4) | Set (1, 4) |
| 5 (0101) | Set (0, 5) | Set (1, 5) |
| 6 (0110) | Set (0, 6) | Set (1, 6) |
| 7 (0111) | Set (0, 7) | Set (1, 7) |
| 8 (1000) | Set (0, 8) | Set (1, 8) |
| 9 (1001) | Set (0, 9) | Set (1, 9) |
| 10 (1010) | Set (0, 10) | Set (1, 10) |
| 11 (1011) | Set (0, 11) | Set (1, 11) |
| 12 (1100) | Set (0, 12) | Set (1, 12) |
| 13 (1101) | Set (0, 13) | Set (1, 13) |
| 14 (1110) | Set (0, 14) | Set (1, 14) |
| 15 (1111) | Set (0, 15) | Set (1, 15) |

FIG. 7A

PUCCH resource set (0, n) for PUCCH Format 0

| DCI (PUCCH resource indicator) | PUCCH resource |
|---|---|
| 0 (00) | PUCCH resource (0, n, 0) |
| 1 (01) | PUCCH resource (0, n, 1) |
| 2 (10) | PUCCH resource (0, n, 2) |
| 3 (11) | PUCCH resource (0, n, 3) |

FIG. 7B

PUCCH resource (n, x) for PUCCH Format 0

| PUCCH Format | 0 |
|---|---|
| Starting Symbol | A(0, n, x) |
| Number of Symbols | B(0, n, x) |
| PRB index for 1st hop | C(0, n, x) |
| PRB index for 2nd hop | D(0, n, x) |
| Frequency hopping | On or off |
| Cyclic shift | E(0, n, x) |

FIG. 7C

PUCCH resource set (1, n) for PUCCH Format 1

| DCI (PUCCH resource indicator) | PUCCH resource |
|---|---|
| 0 (00) | PUCCH resource (1, n, 0) |
| 1 (01) | PUCCH resource (1, n, 1) |
| 2 (10) | PUCCH resource (1, n, 2) |
| 3 (11) | PUCCH resource (1, n, 3) |

FIG. 7D

PUCCH resource (n, x) for PUCCH Format 1

| PUCCH Format | 1 |
|---|---|
| Starting Symbol | A(1, n, x) |
| Number of Symbols | B(1, n, x) |
| PRB index for 1st hop | C(1, n, x) |
| PRB index for 2nd hop | D(1, n, x) |
| Frequency hopping | On or off |
| Cyclic shift | E(1, n, x) |
| Time domain OCC | F(1, n, x) |

FIG. 7E

PUCCH resource (n, x) for PUCCH Format 0

| PUCCH Format | 0 |
|---|---|
| Starting Symbol | A(0, n, x) |
| Number of Symbols | 2 |
| PRB index for 1st hop | C(0, n, x) |
| PRB index for 2nd hop | D(0, n, x) |
| Frequency hopping | On or off |
| Cyclic shift | E(0, n, x) |
| Time domain OCC | F(0, n, x) |

FIG. 10

PUCCH resource (n, x) for PUCCH Format 1

| PUCCH Format | 1 |
|---|---|
| Starting Symbol | 0 |
| Number of Symbols | 14 |
| PRB index for 1st hop | C(1, n, x) |
| PRB index for 2nd hop | D(1, n, x) |
| Frequency hopping | On or off |
| Cyclic shift | E(1, n, x) |
| Time domain OCC | F(1, n, x) |

FIG. 11

PUCCH resource (n, x) for PUCCH Format 0

| PUCCH Format | 0 |
|---|---|
| Starting Symbol | 12 |
| Number of Symbols | 2 |
| PRB index for 1st hop | C(0, n, x) |
| PRB index for 2nd hop | D(0, n, x) |
| Frequency hopping | On or off |
| Cyclic shift | E(0, n, x) |
| Time domain OCC | F(0, n, x) |

FIG. 12

PUCCH resource (n, x) for PUCCH Format 0

| PUCCH Format | 0 |
|---|---|
| Starting Symbol | A(0, n, x) |
| Number of Symbols | B(0, n, x) |
| PRB index for 1st hop | C(0, n, x) |
| PRB index for 2nd hop | D(0, n, x) |
| Frequency hopping | On |
| Cyclic shift | E(0, n, x) |
| Time domain OCC | F(0, n, x) |

FIG. 13A

PUCCH resource (n, x) for PUCCH Format 1

| PUCCH Format | 1 |
|---|---|
| Starting Symbol | A(1, n, x) |
| Number of Symbols | B(1, n, x) |
| PRB index for 1st hop | C(1, n, x) |
| PRB index for 2nd hop | D(1, n, x) |
| Frequency hopping | On |
| Cyclic shift | E(1, n, x) |
| Time domain OCC | F(1, n, x) |

FIG. 13B

PUCCH resource (n, x) for PUCCH Format 0

| PUCCH Format | 0 |
|---|---|
| Starting Symbol | A(0, n, x) |
| Number of Symbols | B(0, n, x) |
| PRB index for 1st hop | C(0, n, x) |
| PRB index for 2nd hop | Mirror position of C(0, n ,x) |
| Frequency hopping | On |
| Cyclic shift | E(0, n, x) |
| Time domain OCC | F(0, n, x) |

FIG. 14A

PUCCH resource (n, x) for PUCCH Format 1

| PUCCH Format | 1 |
|---|---|
| Starting Symbol | A(1, n, x) |
| Number of Symbols | B(1, n, x) |
| PRB index for 1st hop | C(1, n, x) |
| PRB index for 2nd hop | Mirror position of C(0, n ,x) |
| Frequency hopping | On |
| Cyclic shift | E(1, n, x) |
| Time domain OCC | F(1, n, x) |

FIG. 14B

4bits in RMSI to PUCCH resource set mapping

| Index in RMSI | PUCCH resource set for Msg.1 resource 0 | PUCCH resource set for Msg.1 resource 1 |
|---|---|---|
| 0 (0000) | Set (0, 0) | Set (1, 0) |
| 1 (0001) | Set (0, 1) | Set (1, 1) |
| 2 (0010) | Set (0, 2) | Set (1, 2) |
| 3 (0011) | Set (0, 3) | Set (1, 3) |
| 4 (0100) | Set (0, 4) | Set (1, 4) |
| 5 (0101) | Set (0, 5) | Set (1, 5) |
| 6 (0110) | Set (0, 6) | Set (1, 6) |
| 7 (0111) | Set (0, 7) | Set (1, 7) |
| 8 (1000) | Set (0, 8) | Set (1, 8) |
| 9 (1001) | Set (0, 9) | Set (1, 9) |
| 10 (1010) | Set (0, 10) | Set (1, 10) |
| 11 (1011) | Set (0, 11) | Set (1, 11) |
| 12 (1100) | Set (0, 12) | Set (1, 12) |
| 13 (1101) | Set (0, 13) | Set (1, 13) |
| 14 (1110) | Set (0, 14) | Set (1, 14) |
| 15 (1111) | Set (0, 15) | Set (1, 15) |

FIG. 15A

PUCCH resource set (0, n) for Msg.1 resource 0

| DCI (PUCCH resource indicator) | PUCCH resource |
|---|---|
| 0 (00) | PUCCH resource (0, n, 0) |
| 1 (01) | PUCCH resource (0, n, 1) |
| 2 (10) | PUCCH resource (0, n, 2) |
| 3 (11) | PUCCH resource (0, n, 3) |

FIG. 15B

PUCCH resource (n, x) for Msg.1 resource 0

| PUCCH Format | 0 or 1 |
|---|---|
| Starting Symbol | A(0, n, x) |
| Number of Symbols | B(0, n, x) |
| PRB index for 1st hop | C(0, n, x) |
| PRB index for 2nd hop | D(0, n, x) |
| Frequency hopping | On or off |
| Cyclic shift | E(0, n, x) |
| Time domain OCC | F(0, n, x) |

FIG. 15C

PUCCH resource set (1, n) for Msg.1 resource 1

| DCI (PUCCH resource indicator) | PUCCH resource |
|---|---|
| 0 (00) | PUCCH resource (1, n, 0) |
| 1 (01) | PUCCH resource (1, n, 1) |
| 2 (10) | PUCCH resource (1, n, 2) |
| 3 (11) | PUCCH resource (1, n, 3) |

FIG. 15D

PUCCH resource (n, x) for Msg.1 resource 1

| PUCCH Format | 0 or 1 |
|---|---|
| Starting Symbol | A(1, n, x) |
| Number of Symbols | B(1, n, x) |
| PRB index for 1st hop | C(1, n, x) |
| PRB index for 2nd hop | D(1, n, x) |
| Frequency hopping | On or off |
| Cyclic shift | E(1, n, x) |
| Time domain OCC | F(1, n, x) |

FIG. 15E

PUCCH resource (n, x) for Msg.1 resource 0

| PUCCH Format | 0 or 1 |
|---|---|
| Starting Symbol | A(0, n, x) |
| Number of Symbols | B(0, n, x) |
| PRB index for 1st hop | PRB for Msg.1 + C(1, n, x) |
| PRB index for 2nd hop | D(0, n, x) |
| Frequency hopping | On or off |
| Cyclic shift | E(0, n, x) |
| Time domain OCC | F(0, n, x) |

FIG. 16A

PUCCH resource (n, x) for Msg.1 resource 1

| PUCCH Format | 0 or 1 |
|---|---|
| Starting Symbol | A(1, n, x) |
| Number of Symbols | B(1, n, x) |
| PRB index for 1st hop | PRB for Msg.1 + C(1, n, x) |
| PRB index for 2nd hop | D(1, n, x) |
| Frequency hopping | On or off |
| Cyclic shift | E(1, n, x) |
| Time domain OCC | F(1, n, x) |

FIG. 16B

4bits in RMSI to PUCCH resource set mapping

| Index in RMSI | PUCCH resource set for Msg.3 resource 0 | PUCCH resource set for Msg.3 resource 1 |
|---|---|---|
| 0 (0000) | Set (0, 0) | Set (1, 0) |
| 1 (0001) | Set (0, 1) | Set (1, 1) |
| 2 (0010) | Set (0, 2) | Set (1, 2) |
| 3 (0011) | Set (0, 3) | Set (1, 3) |
| 4 (0100) | Set (0, 4) | Set (1, 4) |
| 5 (0101) | Set (0, 5) | Set (1, 5) |
| 6 (0110) | Set (0, 6) | Set (1, 6) |
| 7 (0111) | Set (0, 7) | Set (1, 7) |
| 8 (1000) | Set (0, 8) | Set (1, 8) |
| 9 (1001) | Set (0, 9) | Set (1, 9) |
| 10 (1010) | Set (0, 10) | Set (1, 10) |
| 11 (1011) | Set (0, 11) | Set (1, 11) |
| 12 (1100) | Set (0, 12) | Set (1, 12) |
| 13 (1101) | Set (0, 13) | Set (1, 13) |
| 14 (1110) | Set (0, 14) | Set (1, 14) |
| 15 (1111) | Set (0, 15) | Set (1, 15) |

FIG. 19A

PUCCH resource set (0, n) for Msg.3 resource 0

| DCI (PUCCH resource indicator) | PUCCH resource |
|---|---|
| 0 (00) | PUCCH resource (0, n, 0) |
| 1 (01) | PUCCH resource (0, n, 1) |
| 2 (10) | PUCCH resource (0, n, 2) |
| 3 (11) | PUCCH resource (0, n, 3) |

FIG. 19B

PUCCH resource (n, x) for Msg.3 resource 0

| PUCCH Format | 0 or 1 |
|---|---|
| Starting Symbol | A(0, n, x) |
| Number of Symbols | B(0, n, x) |
| PRB index for 1st hop | C(0, n, x) |
| PRB index for 2nd hop | D(0, n, x) |
| Frequency hopping | On or off |
| Cyclic shift | E(0, n, x) |
| Time domain OCC | F(0, n, x) |

FIG. 19C

PUCCH resource set (1, n) for Msg.3 resource 1

| DCI (PUCCH resource indicator) | PUCCH resource |
|---|---|
| 0 (00) | PUCCH resource (1, n, 0) |
| 1 (01) | PUCCH resource (1, n, 1) |
| 2 (10) | PUCCH resource (1, n, 2) |
| 3 (11) | PUCCH resource (1, n, 3) |

FIG. 19D

PUCCH resource (n, x) for Msg.3 resource 1

| PUCCH Format | 0 or 1 |
|---|---|
| Starting Symbol | A(1, n, x) |
| Number of Symbols | B(1, n, x) |
| PRB index for 1st hop | C(1, n, x) |
| PRB index for 2nd hop | D(1, n, x) |
| Frequency hopping | On or off |
| Cyclic shift | E(1, n, x) |
| Time domain OCC | F(1, n, x) |

FIG. 19E

PUCCH resource (n, x) for Msg.3 resource 0

| PUCCH Format | 0 or 1 |
|---|---|
| Starting Symbol | A(0, n, x) |
| Number of Symbols | B(0, n, x) |
| PRB index for 1st hop | PRB for Msg.3 + C(1, n, x) |
| PRB index for 2nd hop | D(0, n, x) |
| Frequency hopping | On or off |
| Cyclic shift | E(0, n, x) |
| Time domain OCC | F(0, n, x) |

FIG. 20A

PUCCH resource (n, x) for Msg.3 resource 1

| PUCCH Format | 0 or 1 |
|---|---|
| Starting Symbol | A(1, n, x) |
| Number of Symbols | B(1, n, x) |
| PRB index for 1st hop | PRB for Msg.3 + C(1, n, x) |
| PRB index for 2nd hop | D(1, n, x) |
| Frequency hopping | On or off |
| Cyclic shift | E(1, n, x) |
| Time domain OCC | F(1, n, x) |

FIG. 20B

BASE STATION, TERMINAL, AND COMMUNICATION METHOD

TECHNICAL FIELD

The present disclosure relates to a base station, a terminal, and a communication method.

BACKGROUND ART

With the recent spread of services using mobile broadband, the data traffic in mobile communication has been exponentially increasing. For this reason, the expansion of data transmission capacity for the upcoming feature has been considered an urgent task. In addition, drastic advancements in Internet of Things (IoT) in which any kind of "things" are connected together via the Internet are expected in the years to come. In order to support diversification of services with IoT, drastic advancements are required not only in the data transmission capacity but also in various requirements such as low latency and communication areas (coverage). With this background in mind, technical development and standardization of the $5^{th}$ generation mobile communication systems (5G) have been made, which significantly improves the performances and features as compared with the $4^{th}$ generation mobile communication systems (4G).

The 3rd generation partnership project (3GPP) has been making the technical development of a new radio access technology (NR: New Radio) not necessarily having backward compatibility with Long Term Evolution (LTE)-Advanced in the standardization of 5G.

In NR, a terminal (UE: User Equipment) transmits, to a base station (eNB or gNB), using an uplink (UL) control channel (PUCCH: Physical Uplink Control Channel), a response signal (ACK/NACK: Acknowledgement/Negative Acknowledgement) indicating an error detection result for downlink (DL) data, DL channel state information (CSI), and a UL radio resource assignment request (SR: Scheduling Request) (e.g., see Non-Patent Literature (hereinafter, referred to as "NPL") 1 and NPLs 2 and 3) as in LTE.

PUCCH resource parameters in NR, which has been standardized by 3GPP, include a symbol position in a slot (hereinafter, in-slot symbol position), the number of symbols in a slot (hereinafter, the number of in-slot symbols), a frequency position, the on or off (on-off) state (enabled/disabled) of application of frequency hopping, and a code resource (such as a cyclic shift sequence or orthogonal code) (e.g., see, NPL 3). Terminals need to identify a parameter relating to a PUCCH resource in order to transmit the information described above (ACK/NACK, CSI, or SR).

In NR, for identifying a PUCCH resource for transmitting an ACK/NACK for DL data, a method is employed in which a base station indicates a semi-static PUCCH resource set by a UE-specific higher layer signal (e.g., Radio Resource Control (RRC) signaling), and indicates, via Downlink Control Information (DCI), which PUCCH resource in the PUCCH resource set is to be actually used (e.g., see, NPL 3). As described above, the PUCCH resources are formed by the parameters including an in-slot symbol position, the number of in-slot symbols, a frequency position, the on-off state (enabled/disabled) of application of frequency hopping, and a code resource (such as a cyclic shift sequence or orthogonal code), for example.

CITATION LIST

Non-Patent Literature

NPL 1
  3GPP TS 38.211 V2.0.0, "NR; Physical channels and modulation (Release 15)," December 2017

NPL 2
  3GPP TS 38.212 V2.0.0, "NR; Multiplexing and channel coding (Release 15)," December 2017

NPL 3
  3GPP TS 38.213 V2.0.0, "NR; Physical layer procedure for control (Release 15)," December 2017

NPL 4
  RAN1 #91, Chairman's note, November, 2017

SUMMARY

In NR, terminals need to identify, even during the initial access, a parameter relating to a PUCCH resource in order to transmit an ACK/NACK for Message 4 in a Random Access Channel (RACH) procedure. In the method using a UE-specific higher layer signal (RRC signaling) as described above for identifying a PUCCH resource for transmitting an ACK/NACK, however, the method is effective for DL data transmission after completion of RRC connection setup between the base station and the terminal, so that the method cannot be used during the initial access which is before completion of RRC connection setup.

One non-limiting and exemplary embodiment facilitates providing a base station, a terminal, and a communication method each enabling flexible allocation of a PUCCH resource during initial access.

In one general aspect, the techniques disclosed here feature; a base station including: circuitry, which, in operation, determines one set from among a plurality of sets, each of which including one or more candidates for a resource for an uplink (UL) control channel during initial access, and determines one candidate from among the one or more candidates included in the determined set; a transmitter, which in operation, indicates the determined one set to a terminal by higher layer signaling, and indicates the determined one candidate to the terminal by dynamic signaling; and a receiver, which in operation, receives a UL control signal, using the resource corresponding to the determined one candidate in the determined one set, in which an association between a value to be indicated by the higher layer signaling and the plurality of sets is configured for each of one or more parameters relating to the initial access.

In another general aspect, the techniques disclosed here feature; a terminal including: a receiver, which in operation, receives higher layer signaling indicating any of a plurality of sets, each of which including one or more candidates for a resource for an uplink (UL) control channel during initial access, and receives dynamic signaling indicating any of the one or more candidates in the set indicated by the higher layer signaling; and a transmitter, which in operation, transmits a UL control signal, using the resource corresponding to the candidate indicated by the dynamic signaling from among the one or more candidates included in the set indicated by the higher layer signaling, in which an association between a value to be indicated by the higher layer signaling and the plurality of sets is configured for each of one or more parameters relating to the initial access.

In still another general aspect, the techniques disclosed here feature; a communication method including: determining one set from among a plurality of sets, each of which including one or more candidates for a resource for an uplink (UL) control channel during initial access, and determining one candidate from among the one or more candidates included in the determined one set; indicating the determined one set to a terminal by higher layer signaling, and indicating the determined one candidate to the terminal by dynamic signaling; and receiving a UL control signal, using the resource corresponding to the determined one candidate in the determined one set, in which an association between a value to be indicated by the higher layer signaling and the plurality of sets is configured for each of one or more parameters relating to the initial access.

In still another general aspect, the techniques disclosed here feature; a communication method including: receiving higher layer signaling indicating any of a plurality of sets, each of which including one or more candidates for a resource for an uplink (UL) control channel during initial access, and receiving dynamic signaling indicating any of the one or more candidates for the resource, the one or more candidates being included in the set indicated by the higher layer signaling; and transmitting a UL control signal, using the resource corresponding to the candidate indicated by the dynamic signaling from among the one or more candidates included in the set indicated by the higher layer signaling, in which an association between a value to be indicated by the higher layer signaling and the plurality of sets is configured for each of one or more parameters relating to the initial access.

It should be noted that general or specific embodiments may be implemented as a system, an apparatus, a method, an integrated circuit, a computer program or a storage medium, or any selective combination of the system, the apparatus, the method, the integrated circuit, the computer program, and the storage medium.

According to an aspect of this disclosure, a PUCCH resource can be flexibly allocated during the initial access.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 6A is a diagram illustrating an example of an association between RMSI and PUCCH resource sets;

FIG. 6B is a diagram illustrating an example of an association between DCI and PUCCH resources;

FIG. 6C is a diagram illustrating examples of parameters forming PUCCH resources;

FIG. 7A is a diagram illustrating an example of an association between RMSI and PUCCH resource sets according to Embodiment 1;

FIG. 7B is a diagram illustrating an example of an association between DCI and PUCCH resources for PUCCH Format 0 according to Embodiment 1;

FIG. 7C is a diagram illustrating examples of parameters forming PUCCH resources for PUCCH Format 0 according to Embodiment 1;

FIG. 7D is a diagram illustrating an example of an association between DCI and PUCCH resources for PUCCH Format 1 according to Embodiment 1;

FIG. 7E is a diagram illustrating examples of parameters forming PUCCH resources for PUCCH Format 1 according to Embodiment 1;

FIG. 10 is a diagram illustrating examples of parameters forming PUCCH resources for PUCCH Format 0 according to Variation 2 of Embodiment 1;

FIG. 11 is a diagram illustrating examples of parameters forming PUCCH resources for PUCCH Format 1 according to Variation 2 of Embodiment 1;

FIG. 12 is a diagram illustrating examples of parameters forming PUCCH resources for PUCCH Format 0 according to Variation 2 of Embodiment 1;

FIG. 13A is a diagram illustrating examples of parameters forming PUCCH resources for PUCCH Format 0 according to Variation 2 of Embodiment 1;

FIG. 13B is a diagram illustrating examples of parameters forming PUCCH resources for PUCCH Format 1 according to Variation 2 of Embodiment 1;

FIG. 14A is a diagram illustrating examples of parameters forming PUCCH resources for PUCCH Format 0 according to Variation 2 of Embodiment 1;

FIG. 14B is a diagram illustrating examples of parameters forming PUCCH resources for PUCCH Format 1 according to Variation 2 of Embodiment 1;

FIG. 15A is a diagram illustrating an example of an association between RMSI and PUCCH resource sets according to Embodiment 2;

FIG. 15B is a diagram illustrating an example of an association between DCI and PUCCH resources for Msg. 1 resource 0 according to Embodiment 2;

FIG. 15C is a diagram illustrating examples of parameters forming PUCCH resources for Msg. 1 resource 0 according to Embodiment 2;

FIG. 15D is a diagram illustrating an example of an association between DCI and PUCCH resources for Msg. 1 resource 1 according to Embodiment 2;

FIG. 15E is a diagram illustrating examples of parameters forming PUCCH resources for Msg. 1 resource 1 according to Embodiment 2;

FIG. 16A is a diagram illustrating other examples of parameters forming PUCCH resources for Msg. 1 resource 0 according to Embodiment 2;

FIG. 16B is a diagram illustrating other examples of parameters forming PUCCH resources for Msg. 1 resource 1 according to Embodiment 2;

FIG. 19A is a diagram illustrating an example of an association between RMSI and PUCCH resource sets according to Embodiment 3;

FIG. 19B is a diagram illustrating an example of an association between DCI and PUCCH resources for Msg. 3 resource 0 according to Embodiment 3;

FIG. 19C is a diagram illustrating other examples of parameters forming PUCCH resources for Msg. 3 resource 0 according to Embodiment 3;

FIG. 19D is a diagram illustrating an example of an association between DCI and PUCCH resources for Msg. 3 resource 1 according to Embodiment 3;

FIG. 19E is a diagram illustrating examples of parameters forming PUCCH resources for Msg. 3 resource 1 according to Embodiment 3;

FIG. 20A is a diagram illustrating examples of parameters forming PUCCH resources for Msg. 3 resource 0 according to Embodiment 3; and FIG. 20B is a diagram illustrating examples of parameters forming PUCCH resources for Msg. 3 resource 1 according to Embodiment 3.

DESCRIPTION OF EMBODIMENTS

Figure 1:
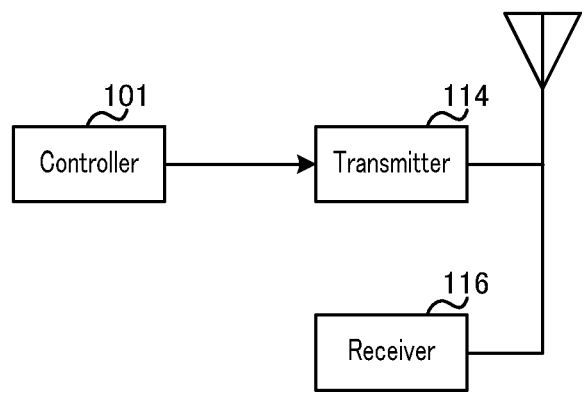
FIG. 1 is a block diagram illustrating part of a configuration of a base station according to Embodiment 1.

Hereinafter, a detailed description will be given of embodiments of the present disclosure with reference to the accompanying drawings.

As described earlier, in NR, terminals need to identify a parameter relating to a PUCCH resource in order to transmit an ACK/NACK for Message 4 in the RACH procedure during the initial access.

In NR, base stations indicate, to terminals, by a cell-specific or group-specific higher layer signal (e.g., RMSI: Remaining Minimum System Information), a PUCCH resource set for transmitting an ACK/NACK for Message 4 (see, NPL 3). It is preferable that the overhead for RMSI at this time be as small as possible. For this reason, in NR, the payload size available for indicating a PUCCH resource set in RMSI has been set to 4 bits (e.g., see, NPL 4).

In this respect, the association between 4 bits (16 patterns) in RMSI and a PUCCH resource set for transmitting an ACK/NACK for Message 4 needs to be discussed in detail.

For PUCCH resources for ACK/NACK for DL data transmission after completion of RRC connection setup, in order to identify a PUCCH resource, it is necessary to configure a plurality of parameters for an in-slot symbol position, the number of in-slot symbols, a frequency position, the on-off state (enabled/disabled) of application of frequency hopping, and a code resource (such as a cyclic shift sequence or orthogonal code), for example.

Furthermore, the range of configurable values for each parameter relating to a PUCCH resource for ACK/NACK for DL data transmission after completion of RRC connection setup is wide. For the in-slot symbol position (starting position), for example, 0 to 13 can be configured for a slot consisting of 14 symbols. Moreover, for the number of in-slot symbols, 1 or 2 symbols can be configured for PUCCH Format 0 (Short PUCCH capable of transmitting 1- or 2-bit response signal), and 4 to 14 symbols can be configured for PUCCH Format 1 (Long PUCCH capable of transmitting 1- or 2-bit response signal). Furthermore, for the frequency position (PRB index), 0 to 274 can be configured. For application of frequency hopping, the on-off state (enabled/disabled) of application of frequency hopping can be configured. For the code resource, cyclic shift sequence indices 0 to 11 can be configured for PUCCH Format 0, and cyclic shift sequence indices 0 to 11, and orthogonal code sequence indices 0 to 6 can be configured for PUCCH Format 1.

Meanwhile, only 4 bits in RMSI are available for indicating a PUCCH resource set for transmitting an ACK/NACK for Message 4 during the initial access (before completion of RRC connection setup) as described above. For this reason, resource allocation as flexible as allocation for a PUCCH resource for ACK/NACK for DL data transmission after completion of RRC connection setup cannot be performed.

In this respect, in an aspect of the present disclosure, a description will be given of a method capable of allocating a PUCCH resource as flexibly as possible even in case where only 4 bits in RMSI are available for indicating a PUCCH resource set for a PUCCH resource (e.g., PUCCH resource for transmitting an ACK/NACK for Message 4) before completion of RRC connection setup in NR.

Hereinafter, each embodiment will be described in detail.

Embodiment 1

[Overview of Communication System]

A communication system according to each embodiment of the present disclosure includes base station 100 and terminal 200.

FIG. 1 is block diagram illustrating part of a configuration of base station 100 according to each embodiment of the present disclosure. In base station 100 illustrated in FIG. 1, controller 101 determines one set of a plurality of sets (PUCCH resource sets) each including one or more candidates for a resource (PUCCH resource) for a UL control channel during initial access and determines one candidate from among the one or more candidates included in the determined set. Transmitter 114 indicates the determined set to terminal 200 by higher layer signaling (e.g., 4 bits in RMSI) and indicates the determined candidate to terminal 200 by dynamic signaling (e.g., PUCCH resource indicator of DCI). Receiver 116 receives a UL control signal (e.g., ACK/NACK for Message 4), using a resource corresponding to the determined candidate in the determined set.

Figure 2:
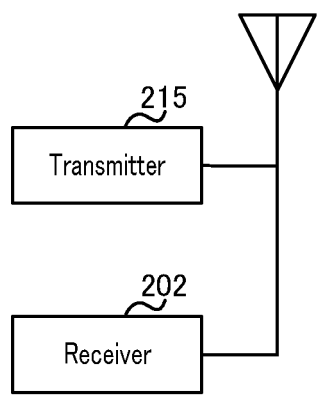
FIG. 2 is a block diagram illustrating part of a configuration of a terminal according to Embodiment 1.

FIG. 2 is a block diagram illustrating part of a configuration of terminal 200 according to each embodiment of the present disclosure. In terminal 200 illustrated in FIG. 2, receiver 202 receives higher layer signaling indicating any of a plurality of sets, each of which including one or more candidates for a resource for a UL control channel during initial access and receives dynamic signaling indicating any of the one or more candidates included in the indicated set. Transmitter 215 transmits a UL control signal (e.g., ACK/NACK for Message 4), using a resource corresponding to the candidate indicated by the dynamic signaling among the one or more candidates included in the set indicated by the higher layer signaling.

In an aspect of the present disclosure, an association between values to be indicated by higher layer signaling (e.g., 4 bits in RMSI) and a plurality of sets (PUCCH resource sets) are configured for each parameter relating to initial access.

[Configuration of Base Station]

Figure 3:
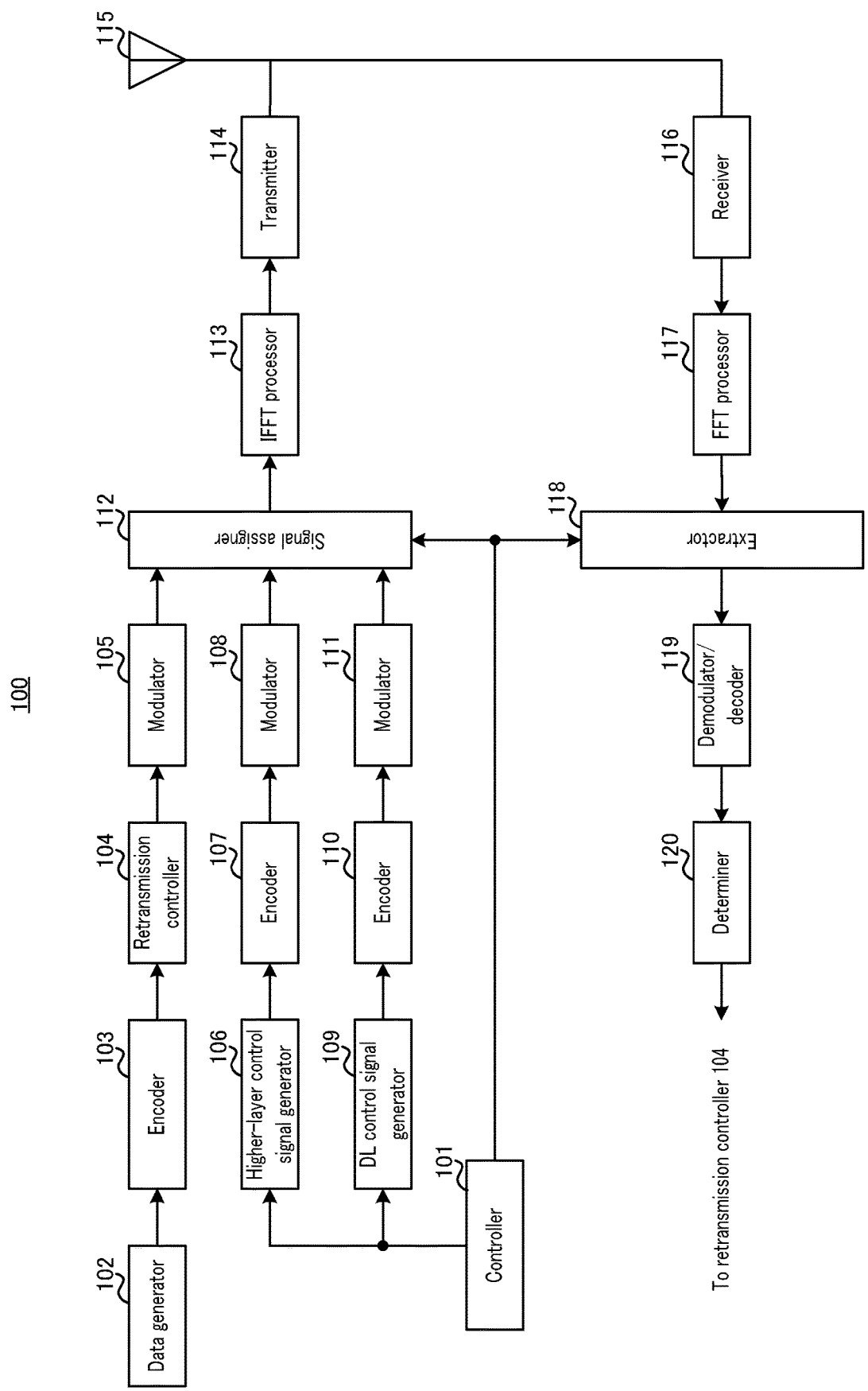
FIG. 3 is a block diagram illustrating the configuration of the base station according to Embodiment 1.

FIG. 3 is a block diagram illustrating a configuration of base station 100 according to Embodiment 1 of the present disclosure. In FIG. 3, base station 100 includes controller 101, data generator 102, encoder 103, retransmission controller 104, modulator 105, higher-layer control signal generator 106, encoder 107, modulator 108, DL control signal generator 109, encoder 110, modulator 111, signal assigner 112, inverse fast Fourier transform (IFFT) processor 113, transmitter 114, antenna 115, receiver 116, fast Fourier transform (FFT) processor 117, extractor 118, demodulator and/or decoder (hereinafter, demodulator/decoder) 119, and determiner 120.

Controller 101 determines a PUCCH resource set for a PUCCH resource before completion of RRC connection setup, which is to be indicated to terminal 200 (e.g., PUCCH resource transmitting an ACK/NACK for Message 4). Controller 101 outputs the determined information to higher-layer control signal generator 106.

Moreover, controller 101 determines a UL resource for ACK/NACK for Message 4 for terminal 200 (i.e., information relating to actual resource use to be indicated by PUCCH resource indicator of DCI) in the PUCCH resource set for the PUCCH resource transmitting an ACK/NACK for Message 4. Controller 101 outputs the determined information to DL control information generator 109.

Controller 101 outputs the determined information to extractor 118 in order to correctly receive a signal from terminal 200.

Moreover, controller 101 determines radio resource allocation for DL data (e.g., Message 4) for terminal 200 and outputs DL resource allocation information for indicating the resource allocation for the DL data to DL control signal generator 109 and signal assigner 112.

Data generator 102 generates DL data (e.g., Message 4) for terminal 200 and outputs the DL data to encoder 103.

Encoder 103 applies error correction coding to the DL data inputted from data generator 102 and outputs the coded data signal to retransmission controller 104.

During the initial transmission, retransmission controller 104 holds the coded data signal inputted from encoder 103 and also outputs the coded data signal to modulator 105. Moreover, when a NACK for the transmitted data signal is inputted from determiner 122 to be described hereinafter, retransmission controller 104 outputs the corresponding data held therein to modulator 105. Meanwhile, when an ACK for the transmitted data signal is inputted from determiner 122, retransmission controller 104 deletes the corresponding data held therein.

Modulator 105 modulates the data signal inputted from retransmission controller 104 and outputs the data modulation signal to signal assigner 112.

Higher-layer control signal generator 106 generates a control information bit sequence (e.g., RMSI), using control information (e.g., PUCCH resource set for ACK/NACK for Message 4) inputted from controller 101, and outputs the generated control information bit sequence to encoder 107.

Encoder 107 applies error correction coding to the control information bit sequence inputted from higher-layer control signal generator 106 and outputs the coded control signal to modulator 108.

Modulator 108 modulates the control signal inputted from encoder 107 and outputs the modulated control signal to signal assigner 112.

DL control signal generator 109 generates a control information bit sequence (e.g., DCI), using control information inputted from controller 101 (information on the UL resource to be actually used by terminal 200, and DL resource allocation information), and outputs the generated control information bit sequence to encoder 110. Note that, DL control signal generator 109 may include the terminal ID of each terminal in control information for each terminal because the control information may be transmitted to a plurality of terminals.

Encoder 110 applies error correction coding to the control information bit sequence inputted from DL control signal generator 109 and outputs the coded control signal to modulator 112.

Modulator 111 modulates the control signal inputted from encoder 110 and outputs the modulated control signal to signal assigner 112.

Signal assigner 112 maps the data signal inputted from modulator 105 to a radio resource based on the DL resource allocation information inputted from controller 101. Furthermore, signal assigner 112 maps the control signal inputted from modulator 108 or modulator 111 to a radio resource. Signal assigner 112 outputs, to IFFT processor 113, the DL signal in which the signal has been mapped.

IFFT processor 113 applies transmission waveform generation processing, such as Orthogonal Frequency Division Multiplexing (OFDM), to the signal inputted from signal assigner 112. IFFT processor 113 adds a Cyclic Prefix (CP) in case of OFDM transmission in which a CP is added (not illustrated). IFFT processor 113 outputs the generated transmission waveform to transmitter 114.

Transmitter 114 applies Radio Frequency (RF) processing, such as Digital-to-Analog (D/A) conversion and/or up-conversion, to the signal inputted from IFFT processor 113, and transmits the radio signal to terminal 200 via antenna 115.

Receiver 116 applies RF processing, such as down-conversion or Analog-to-Digital (A/D) conversion, to the UL signal waveform received from terminal 200 via antenna 115, and outputs the resultant received signal to FFT processor 117.

FFT processor 117 applies FFT processing for converting a time domain signal to a frequency domain signal to the UL signal waveform inputted from receiver 116. FFT processor 117 outputs the frequency domain signal acquired by the FFT processing to extractor 118.

Extractor 118 extracts, from the signal inputted from FFT processor 117, the radio resource on which the ACK/NACK is transmitted, based on the information (information on the UL resource to be actually allocated to terminal 200) received from controller 101, and outputs a component (ACK/NACK) of the extracted radio resource to demodulator/decoder 119.

Demodulator/decoder 119 applies equalization, demodulation, and error correction decoding to the signal inputted from extractor 118, and outputs the decoded bit sequence to determiner 120.

Determiner 120 determines whether the ACK/NACK transmitted from terminal 200 indicates an ACK or NACK for the transmitted data signal, based on the bit sequence inputted from demodulator/decoder 119. Determiner 120 outputs the determination result to retransmission controller 104.

[Configuration of Terminal]

Figure 4:
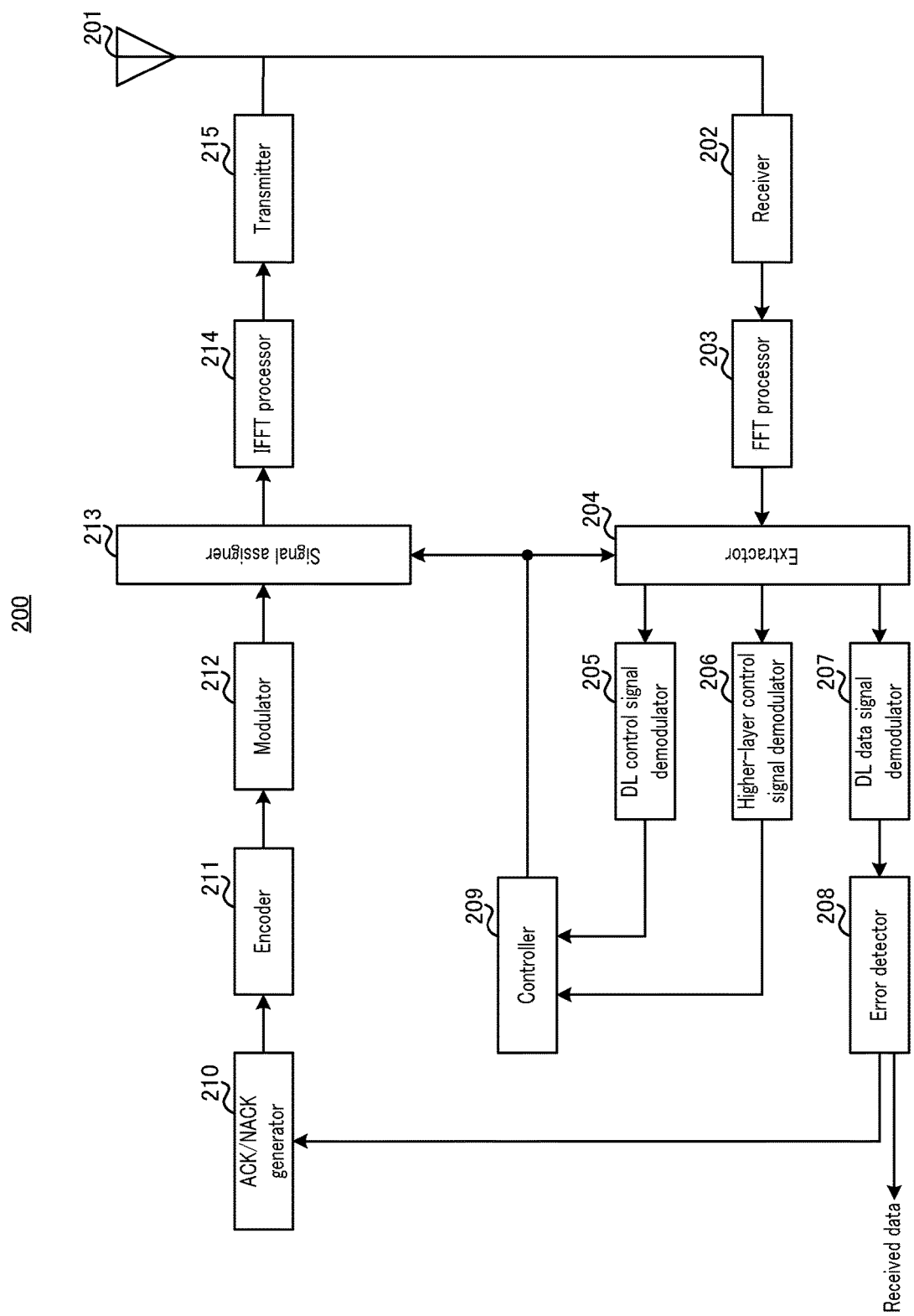
FIG. 4 is a block diagram illustrating the configuration of the terminal according to Embodiment 1.

FIG. 4 is a block diagram illustrating a configuration of terminal 200 according to Embodiment 1 of the present disclosure. In FIG. 4, terminal 200 includes antenna 201, receiver 202, FFT processor 203, extractor 204, DL control signal demodulator 205, higher-layer control signal demodulator 206, DL data signal demodulator 207, error detector 208, controller 209, ACK/NACK generator 210, encoder 211, modulator 212, signal assigner 213, IFFT processor 214, and transmitter 215.

Receiver 202 applies RF processing, such as down-conversion or Analog-to-Digital (A/D) conversion, to the signal waveform of the DL signal (data signal or control signal) received from base station 100 via antenna 201, and outputs the resultant received signal (baseband signal) to FFT processor 203.

FFT processor 203 applies FFT processing for converting a time domain signal to a frequency domain signal to the signal (time domain signal) inputted from receiver 202. FFT processor 203 outputs the frequency domain signal acquired by the FFT processing to extractor 204.

Extractor 204 extracts a DL control signal (DCI) from the signal inputted from FFT processor 203, based on the control information inputted from controller 209, and outputs the DL control signal to DL control signal demodulator 205. Moreover, extractor 204 extracts a higher layer control signal (e.g., RMSI) and DL data signal (e.g., Message 4) based on the control information inputted from controller 209, and outputs the higher layer control signal to higher-layer control signal demodulator 206 and the DL data signal to DL data signal demodulator 207.

DL control signal demodulator 205 blindly decodes the DL control signal inputted from extractor 204, and when determining that the DL control signal is the control signal transmitted for terminal 200 of DL control signal demodulator 205, DL control signal demodulator 205 demodulates the control signal, and outputs the control signal to controller 209.

Higher-layer control signal demodulator 206 demodulates the higher layer control signal inputted from extractor 204, and outputs the demodulated higher layer control signal to controller 209.

DL data signal demodulator 207 demodulates and/or decodes the DL data signal inputted from extractor 204, and outputs the decoded signal to error detector 208.

Error detector 208 performs error detection for the DL data inputted from DL data signal demodulator 207, and outputs the error detection result to ACK/NACK generator 210. Moreover, error detector 208 outputs, as the received data, the DL data that has been determined to have no errors as the result of error detection.

Moreover, controller 209 computes radio resource allocation for the DL data signal based on the DL resource allocation information indicated by the control signal inputted from DL control signal demodulator 205, and outputs the information indicating the radio resource allocation acquired by the computation to extractor 204.

Moreover, controller 209 computes a UL resource to be used by terminal 200 (PUCCH resource transmitting an ACK/NACK for Message 4) by a method to be described hereinafter, using a higher layer control signal (ACK/NACK PUCCH resource set for Message 4, which is to be indicated by RMSI) inputted from higher-layer control signal demodulator 206, and a control signal inputted from DL control signal demodulator 205 (information relating to a UL resource to be actually used by terminal 200, which is to be indicated by DCI). Controller 209 then outputs the information relating to the UL resource acquired by the computation to signal assigner 213.

ACK/NACK generator 210 generates an ACK/NACK (ACK or NACK) for the received DL data (Message 4) based on the error detection result inputted from error detector 208. ACK/NACK generator 210 outputs the generated ACK/NACK (bit sequence) to encoder 211.

Encoder 211 applies error correction coding to the bit sequence inputted from ACK/NACK generator 210, and outputs the coded bit sequence (ACK/NACK) to modulator 212.

Modulator 212 modulates the ACK/NACK inputted from encoder 211, and outputs the modulated ACK/NACK to signal assigner 213.

Signal assigner 213 maps the ACK/NACK inputted from modulator 212 to a radio resource indicated by controller 209. Signal assigner 213 outputs, to IFFT processor 214, the UL signal in the signal has been mapped.

IFFT processor 214 applies transmission waveform generation processing, such as OFDM, to the signal inputted from signal assigner 213. IFFT processor 214 adds a Cyclic Prefix (CP) in case of OFDM transmission in which a CP is added (not illustrated). Alternatively, when IFFT processor 214 is to generate a single carrier waveform, a Discrete Fourier Transform (DFT) processor (not illustrated) may be added before signal assigner 213. IFFT processor 214 outputs the generated transmission waveform to transmitter 215.

Transmitter 215 applies Radio Frequency (RF) processing, such as Digital-to-Analog (D/A) conversion and/or up-conversion, to the signal inputted from IFFT processor 214, and transmits a radio signal to base station 100 via antenna 201.

[Operations of Base Station 100 and Terminal 200]

Operations of base station 100 and terminal 200 having the configurations described above will be described in detail, hereinafter.

Figure 5:
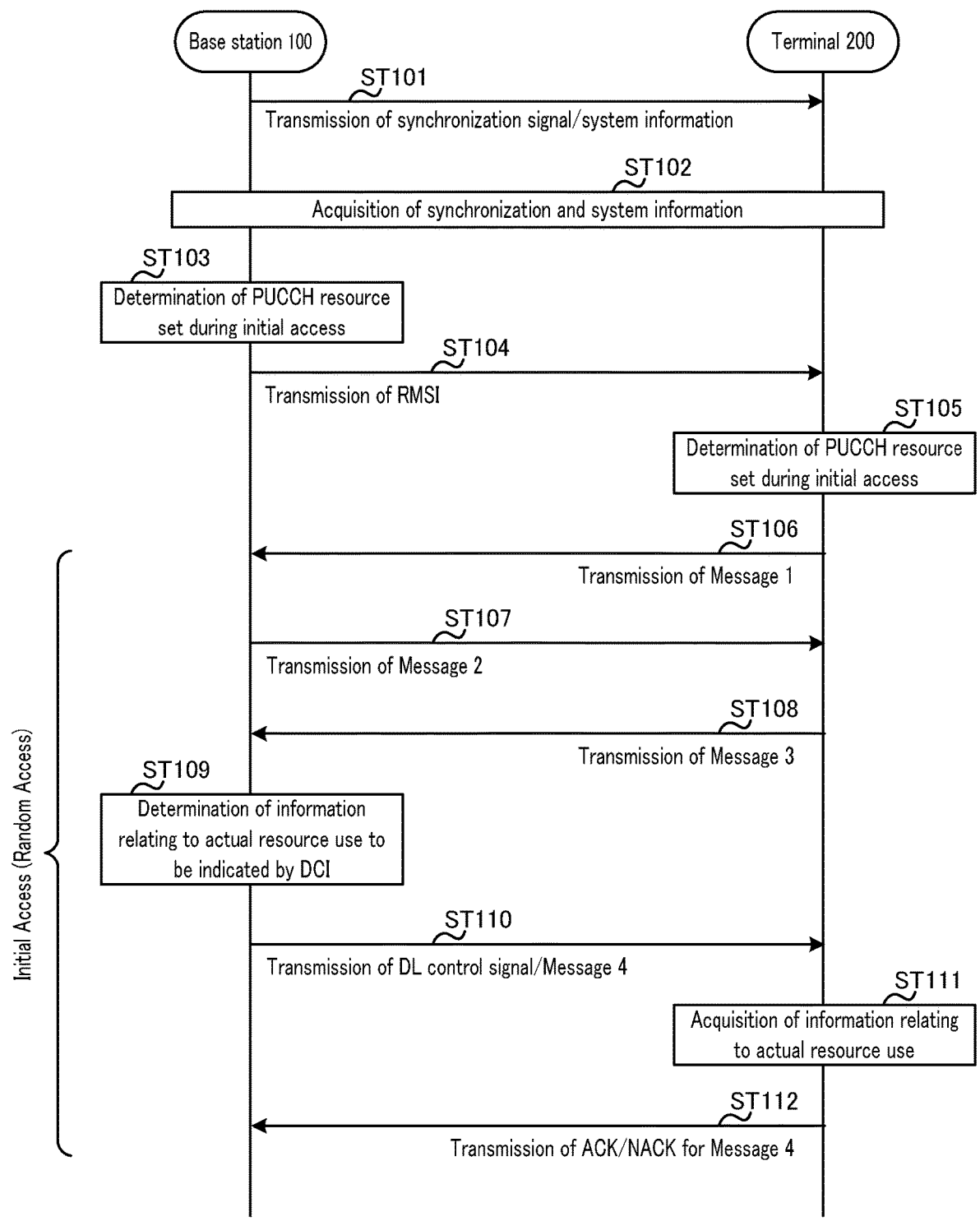
FIG. 5 is a sequence diagram illustrating processing of the base station and the terminal according to Embodiment 1.

FIG. 5 illustrates a processing flow of base station 100 and terminal 200 according to Embodiment 1.

Base station 100 indicates, to terminal 200, a synchronization signal (Primary Synchronization Signal (PSS))/(Secondary Synchronization Signal (SSS)) or system information (Master Information Block (MIB))/(System Information Block (SIB)) (ST101). Terminal 200 acquires the synchronization signal or system information (ST102).

Next, base station 100 determines, for terminal 200, one PUCCH resource set from among a plurality of resource sets during initial access (ST103), and transmits RMSI (4 bits) indicating the determined PUCCH resource set to terminal 200 (ST104). Terminal 200 receives the RMSI (higher layer signaling) transmitted from base station 100 and acquires the PUCCH resource set during the initial access (ST105).

Terminal 200 performs an initial access (random access) procedure (or RRC connection setup) and/or the like with base station 100 (ST106 to ST112).

More specifically, terminal 200 transmits Message 1 (PRACH preamble) to base station 100 (ST106). Base station 100 transmits Message 2 as a response to Message 1 received in ST106 to terminal 200 (ST107).

Next, terminal 200 transmits Message 3 for requesting RRC connection to base station 100 (ST108). Upon reception of Message 3 in ST108, base station 100 determines information relating to actual resource use, which is to be indicated to terminal 200, using DCI, in the PUCCH resource set determined in ST103 (ST109). More specifically, base station 100 determines one candidate from among candidates for a PUCCH resource included in the PUCCH resource set determined in ST103.

Base station 100 indicates, to terminal 200, the information relating to the determined PUCCH resource, and DL control information (DCI) including DL resource allocation information relating to Message 4 (DL data), and transmits Message 4 including the information relating to RRC connection to terminal 200 (ST110). Terminal 200 receives the DCI and acquires the information about the resource use of Message 4, and the information relating to the resource use of an ACK/NACK for Message 4 (ST111).

Terminal 200 then transmits an ACK/NACK for Message 4, using a PUCCH resource identified based on the PUCCH resource set acquired in ST105 and the DCI (PUCCH resource indicator) acquired in ST111, to base station 100 (ST112).

The processing of base station 100 and terminal 200 up to the stage of the initial access has been described thus far.

As described in FIG. 5, base station 100 indicates, to terminal 200, using 4 bits in RMSI, a semi-static PUCCH resource set (PUCCH resource set) relating to a PUCCH resource to be used for transmission of an ACK/NACK for Message 4 (i.e., PUCCH resource before completion of RRC connection setup) (ST104).

The parameters forming a PUCCH resource set include an in-slot symbol position, the number of in-slot symbols, a frequency position, the on-off state (enabled/disabled) of application of frequency hopping, and a code resource (such as a cyclic shift sequence or orthogonal code). In addition, the PUCCH resource set includes a plurality of PUCCH resources (resource candidates) each defined by a combination of the plurality of parameters. The number of PUCCH resources included in one PUCCH resource set may be 4 or 8, for example. The number of PUCCH resources included in one PUCCH resource set is not limited to 4 or 8, however.

Base station 100 indicates which PUCCH resource is to be actually used among the plurality of PUCCH resources included in the PUCCH resource set, by a PUCCH resource indicator included in the DL control signal (DCI) for scheduling Message 4 (ST110). In a case where the number of PUCCH resources included in the PUCCH resource set is 4, for example, 2 bits of DCI can be used for the PUCCH resource indicator. Moreover, in a case where the number of PUCCH resources included in the PUCCH resource set is 8, for example, 3 bits of DCI can be used for the PUCCH resource indicator.

In a case where the number of DCI bits for the PUCCH resource indicator is X bits and the number of PUCCH resources included in the PUCCH resource set is greater than $2^X$, base station 100 may implicitly indicate the PUCCH resource in addition to the explicit indication of PUCCH resource by the PUCCH resource indicator. As a function to implicitly indicate a PUCCH resource, a method is available in which base station 100 indicates a subset of PUCCH resources by the PUCCH resource indicator of DCI, and a PUCCH resource in the subset is implicitly indicated. For implicit indication, an identifier (C-RNTI: Cell-Radio Network Temporary Identifier or IMSI: International Mobile Subscriber Identify) of terminal 200, or a Control Channel Element (CCE) of a DL control channel (PDCCH: Physical Downlink Control Channel) used for DCI transmission to terminal 200 may be used, for example. PUCCH may be implicitly indicated using C-RNTI mod Z, IMSI mod Z, or CCE mod Z and/or the like based on C-RNTI, IMSI, or CCE, for example. The term "Z" herein refers to the number of PUCCH resources included in the subset of PUCCH resources.

For a PUCCH resource to be used for transmission of an ACK/NACK for Message 4 (i.e., PUCCH resource before completion of RRC connection setup), use of one of the following PUCCH formats has been discussed: PUCCH Format 0 (Short PUCCH capable of transmitting 1- or 2-bit ACK/NACK) and PUCCH Format 1 (Long PUCCH capable of transmitting 1- or 2-bit ACK/NACK) (e.g., see NPL 4).

In Embodiment 1, the association between 4 bits (16 patterns) in RMSI and PUCCH resource sets for transmitting an ACK/NACK for Message 4 is differentiated depending on PUCCH formats (the association is different between a case where PUCCH Format 0 is used and a case where PUCCH Format 1 is used).

FIG. 6A illustrates an example of a case where the association between 4 bits (16 patterns) in RMSI and PUCCH resource sets for transmitting an ACK/NACK for Message 4 is common between PUCCH Format 0 and PUCCH Format 1. Furthermore, FIG. 6B illustrates the association between 2 bits (4 patterns of 0 to 3) of DCI (PUCCH resource indicator) and PUCCH resources (PUCCH resources (n, x), where x=0 to 3)) included in the PUCCH resource sets (sets (n), where n=0 to 15) configured in FIG. 6A. Moreover, FIG. 6C illustrates parameters defining PUCCH resources (n, x) configured in FIG. 6B (in-slot symbol position A (n, x), the number of in-slot symbols B (n, x), frequency position (before frequency hopping is applied) C (n, x), frequency position (after frequency hopping is applied) D (n, x), on-off state (enabled/disabled) of application of frequency hopping, code resource (cyclic shift sequence E (n, x), orthogonal code F (n, x))), and PUCCH Format for PUCCH resources (n, x). In case of FIG. 6A, the base station can configure 16 PUCCH resource sets in total for PUCCH Format 0 and PUCCH Format 1.

Meanwhile, FIG. 7A illustrates an example of the association between 4 bits (16 patterns) in RMSI and PUCCH resource sets for transmission of an ACK/NACK for Message 4, according to Embodiment 1.

As illustrated in FIG. 7A, the association between 4 bits (16 patterns) in RMSI and PUCCH resource sets for transmitting an ACK/NACK for Message 4 is configured for each of PUCCH Format 0 and PUCCH Format 1. More specifically, in Embodiment 1, the association between values to be indicated by higher layer signaling (4 bits in RMSI) and a plurality of PUCCH resource sets is configured for each PUCCH format.

FIG. 7B illustrates, for PUCCH Format 0, the association between 2 bits (4 patterns of 0 to 3) of DCI (PUCCH resource indicator) and PUCCH resources (PUCCH resources (0, n, x), where x=0 to 3) included in the PUCCH resource sets (sets (0, n), where n=0 to 15) configured in FIG. 7A. Moreover, FIG. 7C illustrates, for PUCCH Format 0, the parameters defining the PUCCH resources (0, n, x) to be configured in FIG. 7B (in-slot symbol position A (0, n, x), the number of in-slot symbols B (0, n, x), frequency position (before frequency hopping is applied) C (0, n, x), frequency position (after frequency hopping is applied) D (0, n, x), the on-off state (enabled/disabled) of application of frequency hopping, code resource (cyclic shift sequence E (0, n, x))). Note that, in FIG. 7C, the PUCCH format is PUCCH Format 0.

Likewise, FIG. 7D illustrates, for PUCCH Format 1, the association between 2 bits (4 patterns of 0 to 3) of DCI (PUCCH resource indicator) and PUCCH resources (PUCCH resources (1, n, x), where x=0 to 3) included in the PUCCH resource sets (sets (1, n), where n=0 to 15) configured in FIG. 7A. Moreover, FIG. 7E illustrates, for PUCCH Format 1, the parameters defining the PUCCH resources (1, n, x) to be configured in FIG. 7D (in-slot symbol position A (1, n, x), number of in-slot symbols B (1, n, x), frequency position (before frequency hopping is applied) C (1, n, x), frequency position (after frequency hopping is applied) D (1, n, x), on-off state (enabled/disabled) of application of frequency hopping, code resource (cyclic shift sequence E (1, n, x), and orthogonal code F (1, n, x))). Note that, in FIG. 7E, the PUCCH format is PUCCH Format 1.

As illustrated in FIG. 7A, in Embodiment 1, base station 100 can configure 16 PUCCH resource sets for each of PUCCH Format 0 and PUCCH Format 1 and can configure 32 PUCCH resource sets in the entire system. More specifically, according to Embodiment 1 (FIG. 7A), it is made possible to increase the number of configurable PUCCH resource sets as compared with the case where a PUCCH resource set common to each PUCCH format is configured (FIG. 6A).

Moreover, in Embodiment 1, the association between 4 bits in RMSI and PUCCH resource sets is configured for each PUCCH format. Thus, base station 100 can configure parameters for a PUCCH resource set to be indicated by 4 bits in RMSI for each PUCCH format. In PUCCH Format 0, for example, orthogonal code F is not used. Accordingly, since there is no need for base station 100 to indicate orthogonal code F, base station 100 can increase the combination for other parameters in the association between 4 bits in RMSI and PUCCH resource sets by the amount for the orthogonal code F which is unnecessary in this case as shown in FIG. 7C.

As described above, according to Embodiment 1, even in a case where only 4 bits in RMSI are available for indicating a PUCCH resource set during the initial access, each parameter relating to a PUCCH resource for transmitting an ACK/NACK can be flexibly configured.

Variation 1 of Embodiment 1

In Embodiment 1, the association between 4 bits (16 patterns) in RMSI and PUCCH resource sets for transmitting an ACK/NACK for Message 4 is differentiated depending on PUCCH formats (the association is different between a case where PUCCH Format 0 is used and a case where PUCCH Format 1 is used).

In this case, terminal 200 needs to previously identify which PUCCH format (PUCCH Format 0 (Short PUCCH) or PUCCH Format 1 (Long PUCCH)) is to be used. Hereinafter, a description will be given of a method for terminal 200 to identify a PUCCH format.

<Method 1-1>

Figure 8:
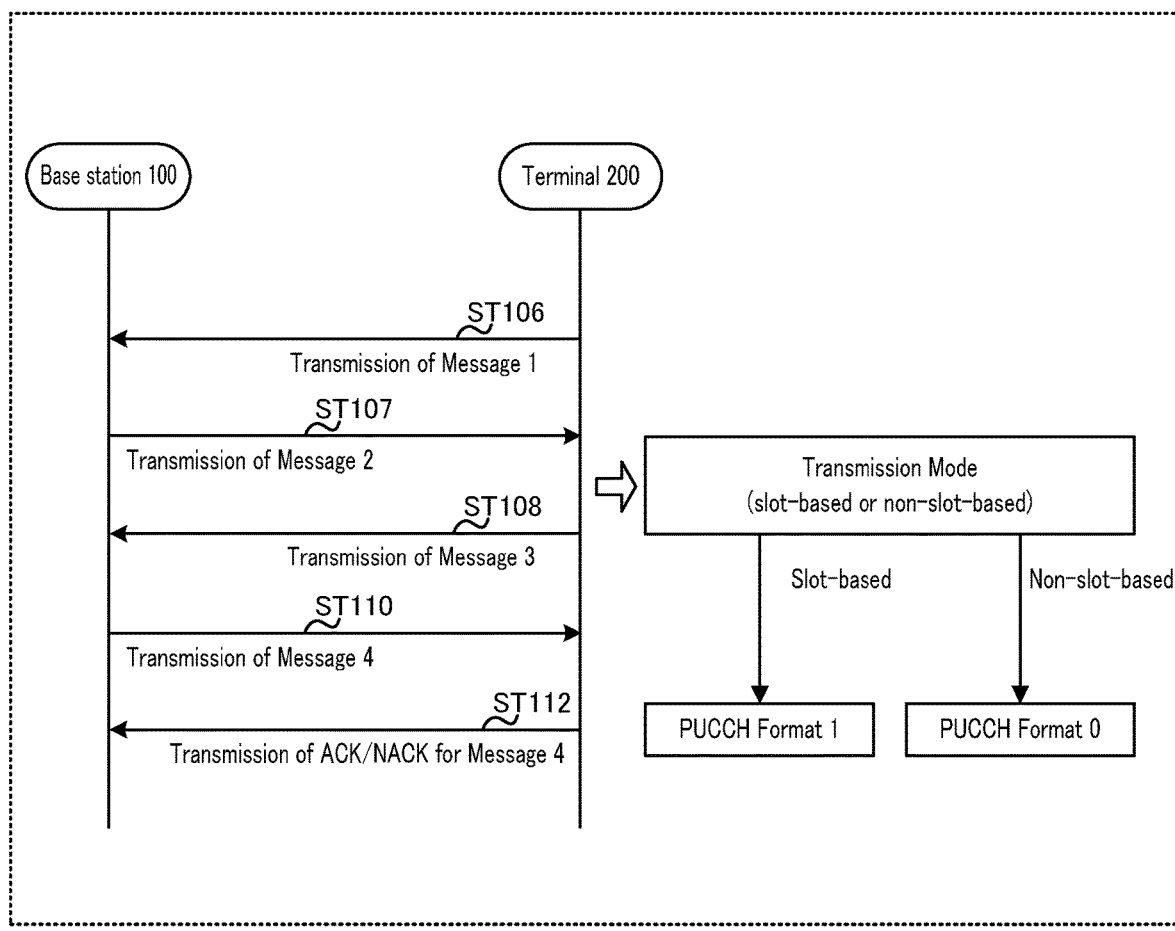
FIG. 8 is a diagram illustrating a PUCCH Format determination method according to Variation 1 of Embodiment 1.

Terminal 200 may determine which PUCCH format for transmitting an ACK/NACK for Message 4 is to be used (which one of PUCCH Format 0 and PUCCH Format 1 is used) based on a transmission mode of Message 2 or Message 3 in the RACH procedure as illustrated in FIG. 8. Note that, FIG. 8 illustrates processing for transmission of Message (ST106 to ST108 and ST110) and transmission of an ACK/NACK for Message 4 (ST112) in the processing illustrated in FIG. 5.

In a case where Message 2 or Message 3 is slot-based transmission (is transmitted in units of slots) (PDSCH mapping type A), for example, terminal 200 may use PUCCH Format 1 for transmission of an ACK/NACK for Message 4, and in a case where Message 2 or Message 3 is non-slot-based transmission (is transmitted not in units of slots) (PDSCH mapping type B or mini-slot based (in units of mini-slots)), for example, terminal 200 may use PUCCH Format 0 for transmission of an ACK/NACK for Message 4.

Thus, the overhead for indicating a PUCCH format to terminal 200 from base station 100 can be reduced.

<Method 1-2>

Terminal 200 may determine which PUCCH format for transmitting an ACK/NACK for Message 4 is to be used (which one of PUCCH Format 0 and PUCCH Format 1 is used) based on information explicitly indicated by Message 4.

Thus, base station 100 can dynamically change a PUCCH format in accordance with an operation condition of terminal 200 at transmission timing of Message 4, for example.

<Method 1-3>

Figure 9:
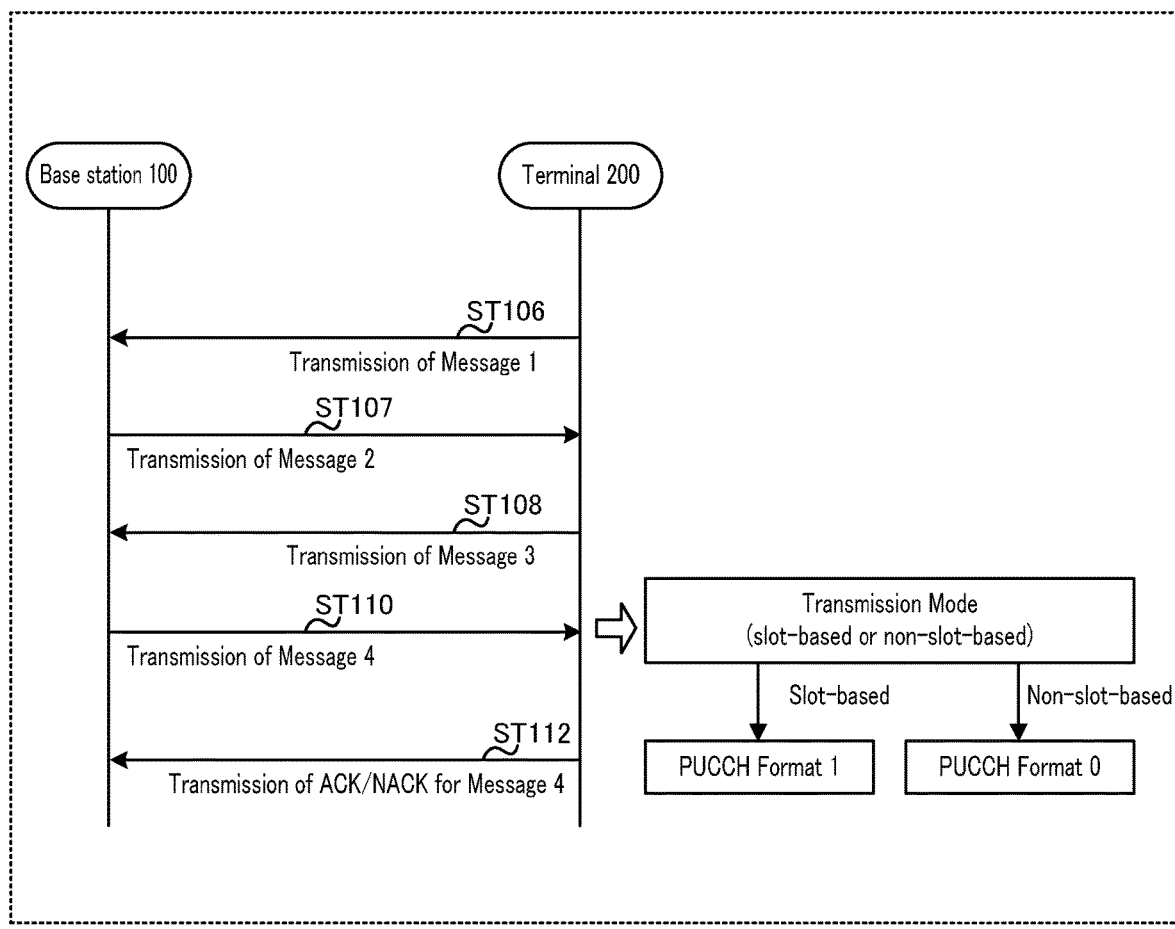
FIG. 9 is a diagram illustrating another PUCCH Format determination method according to Variation 1 of Embodiment 1.

Terminal 200 may determine which PUCCH format for transmitting an ACK/NACK for Message 4 is to be used (which one of PUCCH Format 0 and PUCCH Format 1 is used) based on a transmission mode of Message 4 in the RACH procedure as illustrated in FIG. 9. Note that, FIG. 9 illustrates processing for transmission of Message (ST106 to ST108 and ST110) and transmission of an ACK/NACK for Message 4 (ST112) in the processing illustrated in FIG. 5.

In a case where Message 4 is slot-based transmission (is transmitted in units of slots) (PDSCH mapping type A), for example, terminal 200 may use PUCCH Format 1 for transmission of an ACK/NACK for Message 4, and in a case where Message 4 is non-slot-based transmission (is transmitted not in units of slots) (PDSCH mapping type B), for example, terminal 200 may use PUCCH Format 0 for transmission of an ACK/NACK for Message 4.

Thus, the overhead for indicating a PUCCH format to terminal 200 from base station 100 can be reduced, and base station 100 can dynamically change a PUCCH format.

Variation 2 of Embodiment 1

In Embodiment 1, the association between 4 bits (16 patterns) in RMSI and PUCCH resource sets for transmitting an ACK/NACK for Message 4 is differentiated depending on PUCCH formats (the association is different between a case where PUCCH Format 0 is used and a case where PUCCH Format 1 is used).

Base station 100 can configure 16 PUCCH resource sets for each of PUCCH Format 0 and PUCCH Format 1 as illustrated in FIG. 7A. The parameters defining PUCCH resources as described above, however, include the in-slot symbol position, the number of in-slot symbols, the frequency position, the on-off state (enabled/disabled) of application of frequency hopping, and the code resource (cyclic shift sequence or orthogonal code), for example. For this reason, it is difficult to flexibly configure all parameters (combinations), using 4 bits in RMSI.

In this respect, in Variation 2, one or some of a plurality of parameters relating PUCCH resources for transmitting an ACK/NACK for Message 4 are indicated to terminal 200 by a PUCCH resource set, and the rest of the plurality of parameters are configured without being indicated by the PUCCH resource set. Examples of the parameters that are neither indicated by RMSI nor included in a PUCCH resource set may be a value determined by specification or a value determined by an operation mode while terminal 200 performs the initial access. As described herein, not indicating one or some of the parameters defining PUCCH resources and predetermining these parameters make it possible to flexibly configure a parameter to be indicated by a PUCCH resource set.

Hereinafter, a method for determining a parameter not indicated by a PUCCH resource in Variation 2 will be described. Note that, <Methods 2-1 to 2-7> for determining a parameter, which will be described hereinafter, may be used singularly or in combination.

<Method 2-1>

In PUCCH Format 0 (Short PUCCH), for example, one symbol and two symbols can be configured as the number of symbols in a slot. PUCCH transmitting an ACK/NACK for Message 4, however, requires robust transmission. In this respect, in Method 2-1, the number of symbols for PUCCH Format 0 is fixed to two symbols as illustrated in FIG. 10.

Setting a fixed value for the number of symbols eliminates the need for base station 100 to indicate the number of in-slot symbols, using 4 bits in RMSI for PUCCH Format 0. More specifically, the number of symbols (e.g., parameter B (0, n, x) in FIG. 7C) can be removed from the PUCCH resource sets (sets (0, n)). Thus, base station 100 can more flexibly configure another parameter to be included in the PUCCH resource sets, using 4 bits in RMSI. Moreover, terminal 200 can robustly transmit an ACK/NACK for Message 4, using the fixed two symbols.

Note that, PUCCH Format 0 is used for achieving low latency initial access in some cases. In these cases, the number of symbols may be fixed to one symbol for PUCCH Format 0 (not illustrated). Accordingly, low latency can be achieved in the initial access.

<Method 2-2>

In PUCCH Format 1 (Long PUCCH), for example, 11 candidates of 4 to 14 symbols can be configured as the number of symbols in a slot. Indicating all the 11 candidates, using RMSI, makes it impossible to flexibly configure the rest of the parameters. Moreover, PUCCH transmitting an ACK/NACK for Message 4 requires robust transmission.

In this respect, in Method 2-2, the number of symbols is fixed to 14 symbols for PUCCH Format 1 as illustrated in FIG. 11.

Setting a fixed value for the number of symbols eliminates the need for base station 100 to indicate the number of in-slot symbols, using 4 bits in RMSI for PUCCH Format 1. More specifically, the number of symbols (e.g., parameter B (0, n, x) in FIG. 7E) can be removed from the PUCCH resource sets (sets (1, n)). Thus, base station 100 can more flexibly configure another parameter to be included in the PUCCH resource sets, using 4 bits in RMSI. Moreover, terminal 200 can robustly transmit an ACK/NACK for Message 4, using the fixed 14 symbols.

In addition, as illustrated in FIG. 11, in a case where the number of symbols is fixed to a maximum of 14 symbols, the in-slot symbol position (starting position) is also fixed to symbol index 0 (first symbol in a slot). Thus, in FIG. 11, it becomes unnecessary for base station 100 to indicate not only the number of in-slot symbols (parameter B (1, n, x)) but also the symbol position (i.e., parameter A (1, n, x) illustrated in FIG. 7E), using 4 bits in RMSI, for PUCCH format 1. Accordingly, base station 100 can more flexibly configure another parameter, using 4 bits in RMSI.

Note that, in a case where a plurality of coverages need to be supported in the initial access, a plurality of candidates may be configured for the number of symbols. As a candidate for the number of symbols, in addition to the 14 symbols mentioned above, for example, 7 symbols or 10 symbols may be made configurable.

Note that, the number of symbols to be indicated using RMSI is not limited to 7 symbols, 10 symbols, or 14 symbols, and may be another number of symbols. More specifically, in Method 2-2, among 11 candidates that are configurable as the number of symbols, only one or some candidates may be indicated using RMSI.

Moreover, terminal 200 may implicitly determine the number of symbols of a PUCCH resource based on a slot format indicated by MIB or RMSI. In this case, base station 100 is no longer required to indicate the number of in-slot symbols (parameter B), using 4 bits in RMSI.

<Method 2-3>

In PUCCH Format 0 (Short PUCCH), for example, 14 candidates of symbol indices 0 to 13 can be configured as symbol positions in a slot. Indicating all the 14 candidates, using RMSI makes it impossible to flexibly configure the rest of the parameters.

In this respect, in Method 2-3, the in-slot symbol position (starting position) is fixed to the second symbol from the end of the slot (i.e., symbol index 12) for PUCCH Format 0 as illustrated in FIG. 12.

Setting a fixed value for the in-slot symbol position eliminates the need for base station 100 to indicate the in-slot symbol position, using 4 bits in RMSI, for PUCCH Format 0. More specifically, the symbol position (e.g., parameter A (0, n, x) in FIG. 7C) can be removed from the PUCCH resource sets (sets (0, n)). Thus, base station 100 can more flexibly configure another parameter to be included in the PUCCH resource set, using 4 bits in RMSI.

In addition, as illustrated in FIG. 12, in a case where the symbol position is fixed to the symbol index 12, the number of in-slot symbols may be configured to a fixed value (2 symbols). In FIG. 12, it becomes unnecessary for base station 100 to indicate not only the in-slot symbol position (parameter A (0, n, x)) but also the number of symbols (e.g., parameter B (0, n, x) illustrated in FIG. 7C), using 4 bits in RMSI, for PUCCH Format 0. Accordingly, base station 100 can more flexibly configure another parameter, using 4 bits in RMSI.

Note that, the symbol position to be indicated using RMSI is not limited to the symbol number 12 and may be another symbol position. More specifically, in Method 2-3, among 14 candidates that are configurable as the symbol positions, only one or some candidates may be indicated using RMSI. The symbol position to be indicated using RMSI may be, for example, the symbol index 13 (last symbol in the slot). Furthermore, in a case where the symbol position is fixed to the symbol index 13, the number of in-slot symbols may be fixed to a fixed value (one symbol).

<Method 2-4>

In PUCCH Format 1 (Long PUCCH), for example, 11 candidates of the symbol indices 0 to 10 can be configured as the symbol positions in a slot. Indicating all the 11 candidates, using RMSI makes it impossible to flexibly configure the rest of the parameters.

In this respect, in Method 2-4, the in-slot symbol position is limited to one or some of configurable values (11 candidates) (e.g., one or more symbol positions) for PUCCH Format 1 (not illustrated).

Thus, in a case where the in-slot symbol position is fixed to one symbol position, base station 100 no longer needs to indicate the in-slot symbol position (parameter A (1, n, x)), using 4 bits in RMSI, for PUCCH Format 1. Moreover, in a case where the in-slot symbol position is fixed to some symbol positions, the number of bits required for indicating the symbol position from base station 100 to terminal 200 can be reduced. For this reason, another parameter can be more flexibly configured, using 4 bits in RMSI.

Note that, as described in <Method 2-2>, in a case where only 14 symbols are used as the number of symbols, the symbol position is always configured to the symbol number 0. Accordingly, base station 100 is no longer required to indicate the in-slot symbol position (parameter A (1, n, x)) in FIG. 11. Moreover, in a case where 7 symbols are made configurable as the number of symbols, the symbol position may be limited to the symbol number 7, for example. In this case as well, base station 100 is no longer required to indicate the in-slot symbol position.

<Method 2-5>

In PUCCH Format 0 (Short PUCCH) and PUCCH Format 1 (Long PUCCH), for example, usually, the on-off state (enabled/disabled) of application of frequency hopping is configurable (there is no application of frequency hopping in a case of one symbol of PUCCH Format 0, however). Moreover, PUCCH transmitting an ACK/NACK for Message 4 requires robust transmission.

In this respect, in Method 2-5, frequency hopping is always applied (enabled) as illustrated in FIGS. 13A and 13B. More specifically, the parameter indicating the on-off state (enabled/disabled) of application of frequency hopping always indicates the on state (enabled). Accordingly, base station 100 is no longer required to indicate the on-off state (enabled/disabled) of application of frequency hopping, using 4 bits in RMSI, for PUCCH Format 0 (in case of 2 symbols) and PUCCH Format 1. More specifically, the value indicating the on-off state (enabled/disabled) of application of frequency hopping (value for "Frequency hopping" illustrated in FIGS. 13A and 13B) can be removed from the PUCCH resource sets. Thus, base station 100 can more flexibly configure another parameter to be included in the PUCCH resource set, using 4 bits in RMSI. Moreover, terminal 200 can robustly transmit an ACK/NACK for Message 4 by applying frequency hopping.

Note that, in Method 2-5, it is also possible to configure not to apply frequency hopping at all (disabled all the time). More specifically, the parameter indicating the on-off state (enabled/disabled) of application of frequency hopping may always indicate the off state (disabled). In this case as well, base station 100 is no longer required to indicate the on-off state (enabled/disabled) of application of frequency hopping, using 4 bits in RMSI, for PUCCH Format 0 and PUCCH Format 1.

<Method 2-6>

In a case where frequency hopping is applied, for example, in PUCCH Format 0 (Short PUCCH, in case of 2 symbols) and PUCCH Format 1 (Long PUCCH), PRB indices 0 to 274 can be usually configured as frequency positions (PRB index for 2nd hop) after frequency hopping is applied. It is, however, difficult to indicate the candidates of all the PRB indices, using RMSI.

In this respect, in Method 2-6, as illustrated in FIGS. 14A and 14B, the frequency positions (PRB index for 2nd hop) after frequency hopping is applied are determined based on the frequency positions (PRB index for 1st hop) before frequency hopping is applied. The frequency positions after frequency hopping is applied may be configured, for example, as a mirroring pattern with respect to the frequency positions before frequency hopping is applied around, as the axis, the center of the band of the initial UL band (Initial Uplink BWP: Bandwidth Part) where PUCCH transmitting an ACK/NACK for Message 4 is configured. Note that, the frequency positions after frequency hopping is applied may be determined by another association without being limited to the mirroring pattern of the frequency positions before frequency hopping is applied.

Accordingly, base station 100 is no longer required to indicate the frequency positions after frequency hopping is applied, using 4 bits in RMSI, for PUCCH Format 0 (in case of 2 symbols) and PUCCH Format 1. More specifically, the frequency position (PRB index for 2nd hop) (parameter D) can be removed from the PUCCH resource sets. Thus, base station 100 can more flexibly configure another parameter to be included in the PUCCH resource set, using 4 bits in RMSI.

<Method 2-7>

In PUCCH Format 0 (Short PUCCH) and PUCCH Format 1 (Long PUCCH), for example, PRB indices 0 to 274 can be configured as frequency positions (PRB index for 1st hop). It is, however, difficult to indicate the candidates of all the PRB indices, using RMSI.

In this respect, in Method 2-7, the frequency positions (PRB index for 1st hop) are associated with the initial UL BWP where PUCCH transmitting an ACK/NACK for Message 4 is configured. The frequency positions (PRB index for 1st hop) may be a PRB (predetermined number of PRBs) of an edge of the initial UL BWP, for example.

Thus, base station 100 is no longer required to indicate the frequency position (PRB index for 1st hop), using 4 bits in RMSI, for PUCCH Format 0 (in case of 2 symbols) and PUCCH Format 1 or can reduce the number of bits required for the indication. More specifically, the frequency position (PRB index for 1st hop) (parameter C) can be removed from the PUCCH resource sets or the number of candidates for the frequency positions can be reduced. Thus, base station 100 can more flexibly configure another parameter to be included in the PUCCH resource set, using 4 bits in RMSI.

Variation 3 of Embodiment 1

PUCCH Format 0 and PUCCH Format 1 are sequence transmission using a computer generated (CG) sequence. Thus, in a case where different sequences are assigned to different cells, inter-cell interference occurs due to inter-sequence cross-correlation property. In order to suppress inter-cell interference, there is a method in which different frequency resources are used for different cells. In this case, using a cell ID to vary a PUCCH frequency resource position for each cell makes it possible to reduce the impact of inter-cell interference.

In this respect, in Variation 3, the frequency positions (PRB index for 1st hop and/or PRB index for 2nd hop) of PUCCH Format 0 (Short PUCCH) and PUCCH Format 1 (Long PUCCH) are computed based on cell IDs. The frequency positions may be, for example, a PRB position acquired by adding an offset using a cell ID as a function from a PRB of an edge of the initial UL BWP. Note that, the method of computing a frequency position using a cell ID is not limited to this method, and another method may be employed.

Thus, base station 100 is no longer required to indicate the frequency position, using 4 bits in RMSI, or can reduce the number of bits required for the indication. More specifically, the frequency position (parameter C or D) can be removed from the PUCCH resource sets, or the number of candidates for the frequency positions can be reduced. Thus, base station 100 can more flexibly configure another parameter to be included in the PUCCH resource set, using 4 bits in RMSI.

Moreover, inter-cell interference can be reduced in PUCCH.

Embodiment 2

A base station and a terminal according to Embodiment 2 have basic configurations common to base station 100 and terminal 200 according to Embodiment 1, so that a description will be given while FIGS. 3 and 4 are incorporated herein.

Base station 100 is capable of configuring, in a system, a plurality of resources for terminal 200 to transmit Message 1 in the RACH procedure. In this respect, in Embodiment 2, the association between 4 bits (16 patterns) in RMSI and PUCCH resource sets for transmitting an ACK/NACK for Message 4 is differentiated depending on resources for Message 1 (hereinafter, Message 1 resources) (the association is different for different resources).

As described in Embodiment 1, base station 100 indicates, to terminal 200, using 4 bits in RMSI, a PUCCH resource set relating to a PUCCH resource to be used for transmission of an ACK/NACK for Message 4 (i.e., PUCCH resource before completion of RRC connection setup) (ST104 in FIG. 5).

As in Embodiment 1, the parameters forming a PUCCH resource set include an in-slot symbol position, the number of in-slot symbols, a frequency position, the on-off state (enabled/disabled) of application of frequency hopping, and a code resource (such as a cyclic shift sequence or orthogonal code). In addition, the PUCCH resource set includes a plurality of PUCCH resources each defined by a combination of the plurality of parameters. The number of PUCCH resources included in one PUCCH resource set may be 4 or 8, for example. The number of PUCCH resources included in one PUCCH resource set is not limited to 4 or 8, however.

Moreover, base station 100 indicates which PUCCH resource is to be actually used among the plurality of PUCCH resources included in the PUCCH resource set, by a PUCCH resource indicator included in the DL control signal (DCI) for scheduling Message 4 (ST110 in FIG. 5). In a case where the number of PUCCH resources included in the PUCCH resource set is 4, for example, 2 bits of DCI can be used for the PUCCH resource indicator. Moreover, in a case where the number of PUCCH resources included in the PUCCH resource set is 8, 3 bits of DCI can be used for the PUCCH resource indicator.

In a case where the number of DCI bits for the PUCCH resource indicator is X bits and the number of PUCCH resources included in the PUCCH resource set is greater than $2^X$, base station 100 may implicitly indicate the PUCCH resource in addition to the explicit indication of PUCCH resource by the PUCCH resource indicator. As a function to implicitly indicate a PUCCH resource, a method is available in which base station 100 indicates a subset of PUCCH resources by the PUCCH resource indicator of DCI, and a PUCCH resource in the subset is implicitly indicated. For implicit indication, PUCCH may be implicitly indicated using C-RNTI mod Z, IMSI mod Z, or CCE mod Z and/or the like based on an identifier (C-RNTI or IMSI) of terminal 200, or a CCE of a DL control channel (PDCCH) used for DCI transmission to terminal 200, for example. The term "Z" herein refers to the number of PUCCH resources included in the subset of PUCCH resources.

FIG. 15A illustrates an example of the association between 4 bits (16 patterns) in RMSI and PUCCH resource sets for transmitting an ACK/NACK for Message 4 according to Embodiment 2. As illustrated in FIG. 15A, in Embodiment 2, the association is made between 4 bits (16 patterns) in RMSI and PUCCH resource sets for transmitting an ACK/NACK for Message 4 for each of a plurality of Message 1 resources (a plurality of resources are configured (two in FIG. 15A)) (Message 1 resource 0 and Message 1 resource 1). More specifically, in Embodiment 2, the association between a value (4 bits in RMSI) to be indicated by higher layer signaling, and a plurality of PUCCH resource sets is configured for each Message 1 resource.

FIG. 15B illustrates, for Message 1 resource 0, the association between 2 bits (4 patterns of 0 to 3) of DCI (PUCCH resource indicator) and PUCCH resources (PUCCH resources (0, n, x), where x=0 to 3) included in the PUCCH resource sets (sets (0, n), where n=0 to 15) configured in FIG. 15A. Moreover, FIG. 15C illustrates, for Message 1 resource 0, the parameters defining the PUCCH resources (0, n, x) to be configured in FIG. 15B (in-slot symbol position A (0, n, x), the number of in-slot symbols B (0, n, x), frequency position (before frequency hopping is applied) C (0, n, x), frequency position (after frequency hopping is applied) D (0, n, x), the on-off state (enabled/disabled) of application of frequency hopping, code resource (cyclic shift sequence E (0, n, x), and orthogonal code F (0, n, x))), and the PUCCH format for PUCCH resources (0, n, x).

Likewise, FIG. 15D illustrates, for Message 1 resource 1, the association between 2 bits (4 patterns of 0 to 3) of DCI (PUCCH resource indicator) and PUCCH resources (PUCCH resources (1, n, x), where x=0 to 3) included in the PUCCH resource sets (sets (1, n), where n=0 to 15) configured in FIG. 15A. Moreover, FIG. 15E illustrates, for Message 1 resource 1, the parameters defining the PUCCH resources (1, n, x) to be configured in FIG. 15D (in-slot symbol position A (1, n, x), the number of in-slot symbols B (1, n, x), frequency position (before frequency hopping is applied) C (1, n, x), frequency position (after frequency hopping is applied) D (1, n, x), the on-off state (enabled/disabled) of application of frequency hopping, code resource (cyclic shift sequence E (1, n, x), and orthogonal code F (1, n, x))), and the PUCCH format for PUCCH resources (1, n, x).

In a case where, for example, the association between 4 bits (16 patterns) in RMSI and PUCCH resource sets for transmitting an ACK/NACK for Message 4 is common regardless of Message 1 resources (e.g., see FIG. 6A), the base station can configure 16 PUCCH resource sets in total in the system.

In this respect, according to Embodiment 2, since base station 100 can configure 16 PUCCH resource sets for each Message 1 resource, so that (16×N) PUCCH resource sets can be configured for N Message 1 resources in the entire system, for example. More specifically, according to Embodiment 2 (FIG. 15A), it is made possible to increase the number of configurable PUCCH resource sets as compared with the case where a common PUCCH resource set is configured regardless of Message 1 resources.

As described above, according to Embodiment 2, even in a case where only 4 bits in RMSI are available for indicating a PUCCH resource set during the initial access, parameters relating to a PUCCH resource for transmitting an ACK/NACK can be flexibly configured.

Meanwhile, a Message 1 resource configuration is often made in such a manner to avoid occurrence of inter-cell interference between adjacent cells. For this reason, associating a PUCCH resource set for transmitting an ACK/NACK for Message 4 with a Message 1 resource brings an advantage in that inter-cell interference of PUCCH resources for transmitting an ACK/NACK for Message 4 can be avoided at the same time.

Moreover, as the association between a Message 1 resource and a PUCCH resource for transmitting an ACK/NACK for Message 4, a frequency position (PRB number) of a PUCCH resource for transmitting an ACK/NACK for Message 4 may be determined with reference to a frequency resource of Message 1 (PRB for Msg. 1) as illustrated in FIGS. 16A and 16B, for example.

Variation of Embodiment 2

In Embodiment 2, base station 100 can configure 16 PUCCH resource sets for each Message 1 resource. The parameters defining PUCCH resources as described above, however, include the in-slot symbol position, the number of in-slot symbols, the frequency position, the on-off state (enabled/disabled) of application of frequency hopping, and the code resource (cyclic shift sequence or orthogonal code), for example. For this reason, it is difficult to flexibly configure all parameters (combinations), using 4 bits in RMSI.

In this respect, in a variation of Embodiment 2, for the plurality of parameters defining a PUCCH resource for transmitting an ACK/NACK for Message 4, as in <Methods 2-1 to 2-7> in Variation 2 of Embodiment 1, one or some of the plurality of parameters are indicated to terminal 200 by a PUCCH resource set, and the rest of the plurality of parameters are configured without being indicated by the PUCCH resource set.

Furthermore, as to the PUCCH formats, as in <Methods 1-1 to 1-3> in Variation 1 of Embodiment 1, the PUCCH formats may not be included in the indication by RMSI. Moreover, as to the PUCCH formats, the PUCCH formats may be determined in association with Message 1 based on the following methods other than <Methods 1-1 to 1-3>.

<Method 4-1>

Figure 17:
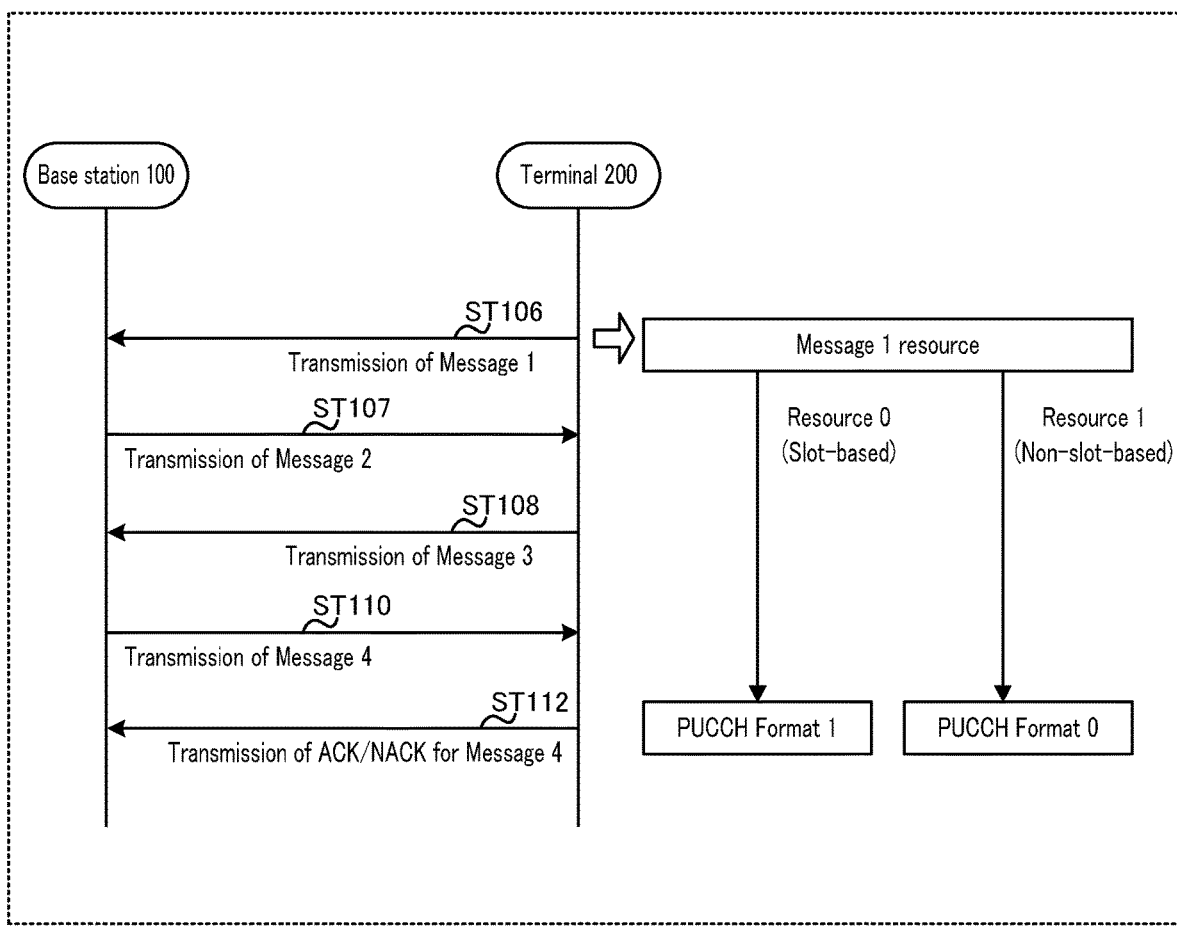
FIG. 17 is a diagram illustrating a PUCCH Format determination method according to a variation of Embodiment 2.

Terminal 200 may determine which PUCCH format for transmitting an ACK/NACK for Message 4 is to be used (which one of PUCCH Format 0 and PUCCH Format 1 is used) based on a Message 1 resource in the RACH procedure as illustrated in FIG. 17. Note that, FIG. 17 illustrates processing for transmission of Message (ST106 to ST108 and ST110) and transmission of an ACK/NACK for Message 4 (ST112) in the processing illustrated in FIG. 5.

Base station 100, for example, may configure a different Message 1 resource between a case where Message 2, Message 3, or Message 4 is slot-based transmission and a case where Message 2, Message 3, or Message 4 is non-slot-based transmission, and may associate a different PUCCH format for each Message 1 resource. In FIG. 17, terminal 200 selects PUCCH Format 1 (Long PUCCH) in a case where Message 1 is transmitted using a Message 1 resource (Resource 0) for slot-based transmission, and terminal 200 selects PUCCH Format 0 (Short PUCCH) in a case where Message 1 is transmitted using a Message 1 resource (Resource 1) for non-slot-based transmission.

With this configuration, terminal 200 can identify a PUCCH format without indication by RMSI, so that the overhead for indicating a PUCCH Format to terminal 200 from base station 100 can be reduced.

<Method 4-2>

Figure 18:
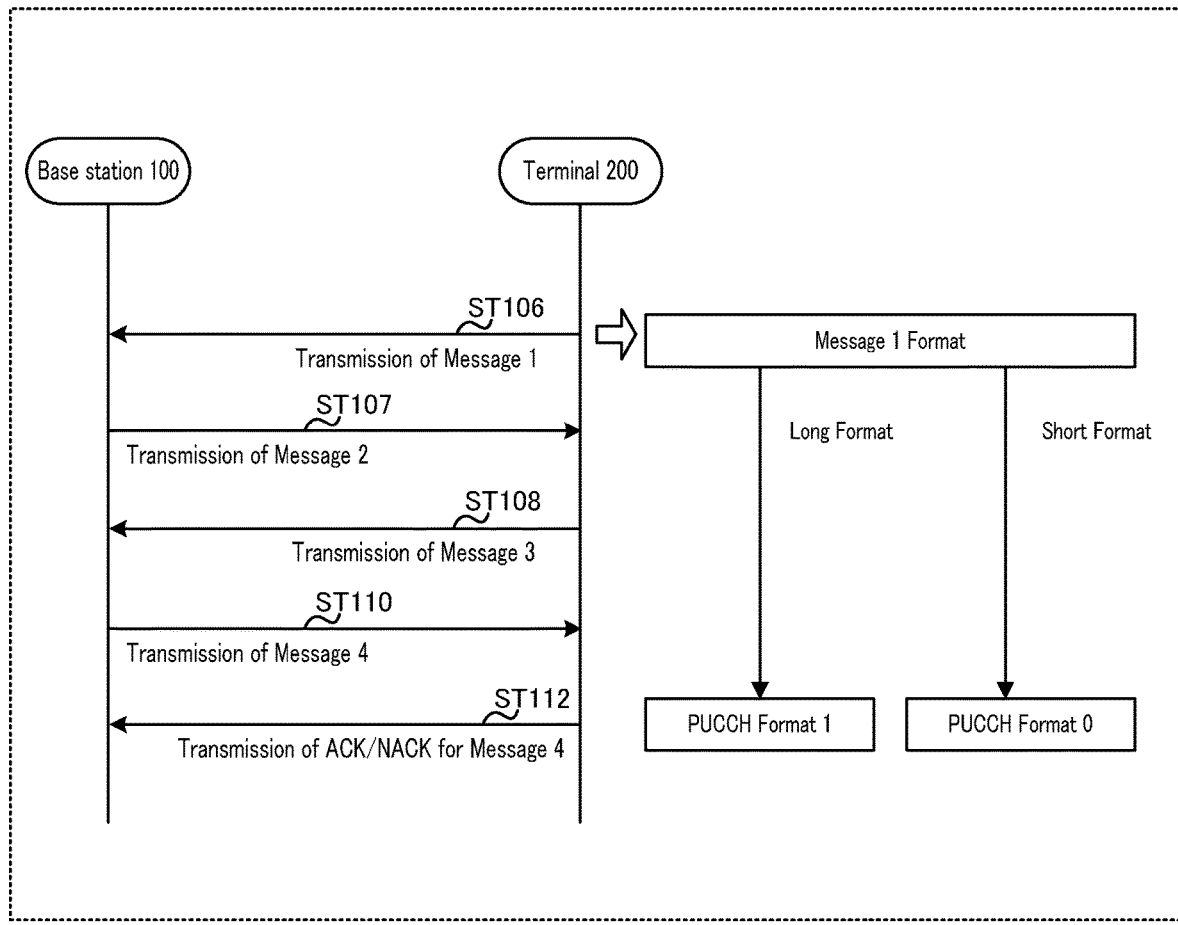
FIG. 18 is a diagram illustrating another PUCCH Format determination method according to the variation of Embodiment 2.

Terminal 200 may determine which PUCCH format for transmitting an ACK/NACK for Message 4 is to be used (which one of PUCCH Format 0 and PUCCH Format 1 is used) based on a Message 1 format (may be called "PRACH format" or "Preamble format") as illustrated in FIG. 18. Note that, FIG. 18 illustrates processing for transmission of Message (ST106 to ST108 and ST110) and transmission of an ACK/NACK for Message 4 (ST112) in the processing illustrated in FIG. 5.

NR supports a plurality of PRACH formats having different sequence lengths for supporting a plurality of coverage levels. In FIG. 18, terminal 200 selects PUCCH Format 0 for transmission of an ACK/NACK for Message 4 in a case where Message 1 is transmitted using a PRACH format having a short sequence length (Short Format), and terminal 200 selects PUCCH Format 1 for transmission of an ACK/NACK for Message 4 in a case where Message 1 is transmitted using a PRACH format having a long sequence length (Short Format).

With this configuration, terminal 200 can identify a PUCCH format without indication by RMSI, so that the overhead for indicating a PUCCH Format to terminal 200 from base station 100 can be reduced.

Embodiment 3

A base station and a terminal according to Embodiment 3 have basic configurations common to base station 100 and terminal 200 according to Embodiment 1, so that a description will be given while FIGS. 3 and 4 are incorporated herein.

Base station 100 is capable of allocating a resource for terminal 200 to transmit Message 3 in the RACH procedure. In this respect, in Embodiment 3, the association between 4 bits (16 patterns) in RMSI and PUCCH resource sets for transmitting an ACK/NACK for Message 4 is differentiated depending on resources for Message 3 resources (the association is different for different resources).

As described in Embodiment 1, base station 100 indicates, to terminal 200, using 4 bits in RMSI, a PUCCH resource set relating to a PUCCH resource to be used for transmission of an ACK/NACK for Message 4 (i.e., PUCCH resource before completion of RRC connection setup) (ST104 in FIG. 5).

As in Embodiment 1, the parameters forming a PUCCH resource set include an in-slot symbol position, the number of in-slot symbols, a frequency position, the on-off state (enabled/disabled) of application of frequency hopping, and a code resource (such as a cyclic shift sequence or orthogonal code). In addition, the PUCCH resource set includes a plurality of PUCCH resources each defined by a combination of the plurality of parameters. The number of PUCCH resources included in one PUCCH resource set may be 4 or 8, for example. The number of PUCCH resources included in one PUCCH resource set is not limited to 4 or 8, however.

Moreover, base station 100 indicates which PUCCH resource is to be actually used among the plurality of PUCCH resources included in the PUCCH resource set, by a PUCCH resource indicator included in the DL control signal (DCI) for scheduling Message 4 (ST110 in FIG. 5). In a case where the number of PUCCH resources included in the PUCCH resource set is 4, for example, 2 bits of DCI can be used for the PUCCH resource indicator. Moreover, in a case where the number of PUCCH resources included in the PUCCH resource set is 8, 3 bits of DCI can be used for the PUCCH resource indicator.

Furthermore, in a case where the number of DCI bits for the PUCCH resource indicator is X bits and the number of PUCCH resources included in the PUCCH resource set is greater than $2^X$, base station 100 may implicitly indicate the PUCCH resource in addition to the explicit indication of PUCCH resource by the PUCCH resource indicator. As a function to implicitly indicate a PUCCH resource, a method is available in which base station 100 indicates a subset of PUCCH resources by the PUCCH resource indicator of DCI, and a PUCCH resource in the subset is implicitly indicated. For implicit indication, PUCCH may be implicitly indicated using C-RNTI mod Z, IMSI mod Z, or CCE mod Z and/or the like based on an identifier (C-RNTI or IMSI) of terminal 200, or a CCE of a DL control channel (PDCCH) used for DCI transmission to terminal 200, for example. The term "Z" herein refers to the number of PUCCH resources included in the subset of PUCCH resources.

FIG. 19A illustrates an example of the association between 4 bits (16 patterns) in RMSI and PUCCH resource sets for transmitting an ACK/NACK for Message 4 according to Embodiment 3. As illustrated in FIG. 19A, in Embodiment 3, the association is made between 4 bits (16 patterns) in RMSI and PUCCH resource sets for transmitting an ACK/NACK for Message 4, for each of Message 3 resources (Message 3 resource 0 and Message 3 resource 1 in FIG. 19A) allocated to each terminal 200. More specifically, in Embodiment 3, the association between a value (4 bits in RMSI) to be indicated by higher layer signaling, and a plurality of PUCCH resource sets is configured for each Message 3 resource.

FIG. 19B illustrates, for Message 3 resource 0, the association between 2 bits (4 patterns of 0 to 3) of DCI (PUCCH resource indicator) and PUCCH resources (PUCCH resources (0, n, x), where x=0 to 3) included in the PUCCH resource sets (sets (0, n), where n=0 to 15) configured in FIG. 19A. Moreover, FIG. 19C illustrates, for Message 3 resource 0, the parameters defining the PUCCH resources (0, n, x) to be configured in FIG. 19B (in-slot symbol position A (0, n, x), the number of in-slot symbols B (0, n, x), frequency position (before frequency hopping is applied) C (0, n, x), frequency position (after frequency hopping is applied) D (0, n, x), the on-off state (enabled/disabled) of application of frequency hopping, code resource (cyclic shift sequence E (0, n, x), and orthogonal code F (0, n, x))), and the PUCCH format for PUCCH resources (0, n, x).

Likewise, FIG. 19D illustrates, for Message 3 resource 1, the association between 2 bits (4 patterns of 0 to 3) of DCI (PUCCH resource indicator) and PUCCH resources (PUCCH resources (1, n, x), where x=0 to 3) included in the PUCCH resource sets (sets (1, n), where n=0 to 15) configured in FIG. 19A. Moreover, FIG. 19E illustrates, for Message 3 resource 1, the parameters defining the PUCCH resources (1, n, x) to be configured in FIG. 19D (in-slot symbol position A (1, n, x), the number of in-slot symbols B (1, n, x), frequency position (before frequency hopping is applied) C (1, n, x), frequency position (after frequency hopping is applied) D (1, n, x), the on-off state (enabled/disabled) of application of frequency hopping, code resource (cyclic shift sequence E (1, n, x), and orthogonal code F (1, n, x))), and the PUCCH format for PUCCH resources (1, n, x).

In a case where, for example, the association between 4 bits (16 patterns) in RMSI and PUCCH resource sets for transmitting an ACK/NACK for Message 4 is common regardless of Message 3 resources (e.g., see FIG. 6A), the base station can configure 16 PUCCH resource sets in total in the system.

In this respect, according to Embodiment 3, since base station 100 can configure 16 PUCCH resource sets for each Message 3 resource, so that (16×N) PUCCH resource sets can be configured for N Message 3 resources in the entire system, for example. More specifically, according to Embodiment 3 (FIG. 19A), it is made possible to increase the number of configurable PUCCH resource sets as compared with the case where a common PUCCH resource set is configured regardless of Message 3 resources.

As described above, according to Embodiment 3, even in a case where only 4 bits in RMSI are available for indicating a PUCCH resource set during the initial access, parameters relating to a PUCCH resource for transmitting an ACK/NACK can be flexibly configured.

Meanwhile, a Message 3 resource configuration allows flexible resource allocation as compared with the Message 1 resource configuration. For this reason, associating a PUCCH resource set for transmitting an ACK/NACK for Message 4 with a Message 3 resource allows more flexible PUCCH resource allocation for transmitting an ACK/NACK for Message 4.

Moreover, as the association between a Message 3 resource and a PUCCH resource for transmitting an ACK/NACK for Message 4, a frequency position (PRB number) of a PUCCH resource for transmitting an ACK/NACK for Message 4 may be determined with reference to a frequency resource of Message 3 (PRB for Msg. 3) as illustrated in FIGS. 20A and 20B, for example.

For the PUCCH resources for transmitting an ACK/NACK for Message 4, as in <Methods 2-1 to 2-7> in Variation 2 of Embodiment 1, one or some parameters may be indicated to terminal 200 by a PUCCH resource set, and the rest of the parameters may be configured without being indicated by RMSI. Furthermore, for PUCCH formats, as in <Methods 1-1 to 1-3> in Variation 1 of Embodiment 1, and also as in <Methods 4-1 and 4-2> in Variation 2 of Embodiment 2, the PUCCH formats may not be included in the indication by RMSI.

Each embodiment of the present disclosure has been described thus far.

Note that, as to PUCCH for transmitting an ACK/NACK for Message 4, terminal 200 needs to identify which Numerology (subcarrier spacing) is to be used, in addition to the parameters mentioned above. For Numerology (subcarrier spacing) for PUCCH for transmitting an ACK/NACK for Message 4, for example, the same Numerology (subcarrier spacing) as the Numerology for Message 1 or Message 3 may be used, or the Numerology may be determined in association with the Numerology (subcarrier spacing) for Message 1 or Message 3.

Moreover, terminal 200 may determine the Numerology (subcarrier spacing) for PUCCH for transmitting an ACK/NACK for Message 4, based on the information explicitly indicated in the RACH configuration or the information explicitly indicated to terminal 200 from base station 100 by Message 4.

Furthermore, in the embodiments described above, a description has been given of the case where the association between 4 bits in RMSI and a PUCCH resource set is differentiated for each PUCCH Format, each Message 1 resource, or each Message 3 resource. The parameters serving as the basis for differentiating the association between 4 bits in RMSI and a PUCCH resource set are not limited to the PUCCH Format, Message 1 resource, or Message 3 resource, and may be any parameter relating to the initial access (RACH procedure). The parameters serving as the basis for varying the association between 4 bits in RMSI and a PUCCH resource set may be, for example, a pre-configured parameter used in the initial access processing, and may be a parameter relating to an operation mode (operation condition) while the initial access processing is performed.

Furthermore, all or any two of Embodiments 1 to 3 can be applied at the same time. Thus, even more PUCCH resource sets can be configured.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

A base station according to the present disclosure includes: circuitry, which, in operation, determines one set from among a plurality of sets, each of which including one or more candidates for a resource for an uplink (UL) control channel during initial access, and determines one candidate from among the one or more candidates included in the determined set; a transmitter, which in operation, indicates the determined one set to a terminal by higher layer signaling, and indicates the determined one candidate to the terminal by dynamic signaling; and a receiver, which in operation, receives a UL control signal, using the resource corresponding to the determined one candidate in the determined one set, in which an association between a value to be indicated by the higher layer signaling and the plurality of sets is configured for each of one or more parameters relating to the initial access.

In the base station according to the present disclosure, the one or more parameters relating to the initial access include a format of the UL control channel.

In the base station according to the present disclosure, the one or more parameters relating to the initial access include a resource to be used for transmission of Message 1 in the initial access.

In the base station according to the present disclosure, the one or more parameters relating to the initial access include a resource to be used for transmission of Message 3 in the initial access.

In the base station according to the present disclosure, one or some of the one or more parameters relating to the resource for the UL control channel are included in the determined one set and indicated to the terminal, and a remaining one of the one or more parameters is configured without being indicated to the terminal by the determined one set.

In the base station according to the present disclosure: the remaining one of the one or more parameters includes a format of the UL control channel, and the format of the UL control channel is determined based on a transmission mode of Message 2 or Message 3 in the initial access.

In the base station according to the present disclosure: the rest of the one or more parameters includes a format of the UL control channel, and the format of the UL control channel is indicated to the terminal by Message 4 in the initial access.

In the base station according to the present disclosure: the remaining one of the one or more parameters includes a format of the UL control channel, and the format of the UL control channel is determined based on a transmission mode of Message 4 in the initial access.

In the base station according to the present disclosure: the remaining one of the one or more parameters includes at least one of an in-slot symbol position and the number of symbols, and the at least one of the in-slot symbol position and the number of symbols is a fixed value.

In the base station according to the present disclosure: the remaining one of the one or more parameters includes at least one in-slot symbol position, and the at least one in-slot symbol position is limited to one or some of configurable values.

In the base station according to the present disclosure: the remaining one of the one or more parameters includes a value indicating an on-off state (enabled/disabled) of application of frequency hopping, and the frequency hopping is always applied.

In the base station according to the present disclosure: the remaining one of the one or more parameters includes a first frequency position after frequency hopping is applied, and the first frequency position is determined based on a second frequency position before the frequency hopping is applied.

In the base station according to the present disclosure: the remaining one of the one or more parameters includes a frequency position, and the frequency position is computed based on a cell ID of a cell in which the terminal is positioned.

In the base station according to the present disclosure, a format of the UL control channel is determined based on a resource to be used for transmission of Message 1 in the initial access.

In the base station according to the present disclosure, a format of the UL control channel is determined based on a format of Message 1 in the initial access.

In the base station according to the present disclosure, subcarrier spacing for the UL control channel is determined based on subcarrier spacing during transmission of Message 1 or Message 3 in the initial access.

In the base station according to the present disclosure, subcarrier spacing for the UL control channel is explicitly indicated to the terminal from the base station.

A terminal according to the present disclosure includes: a receiver, which in operation, receives higher layer signaling indicating any of a plurality of sets, each of which including one or more candidates for a resource for an uplink (UL) control channel during initial access, and receives dynamic signaling indicating any of the one or more candidates in the set indicated by the higher layer signaling; and a transmitter, which in operation, transmits a UL control signal, using the resource corresponding to the candidate indicated by the dynamic signaling from among the one or more candidates included in the set indicated by the higher layer signaling, in which an association between a value to be indicated by the higher layer signaling and the plurality of sets is configured for each of one or more parameters relating to the initial access.

A communication method according to the present disclosure includes: determining one set from among a plurality of sets, each of which including one or more candidates for a resource for an uplink (UL) control channel during initial access, and determining one candidate from among the one or more candidates included in the determined one set; indicating the determined one set to a terminal by higher layer signaling, and indicating the determined one candidate to the terminal by dynamic signaling; and receiving a UL control signal, using the resource corresponding to the determined one candidate in the determined one set, in which an association between a value to be indicated by the higher layer signaling and the plurality of sets is configured for each of one or more parameters relating to the initial access.

A communication method according to the present disclosure includes: receiving higher layer signaling indicating any of a plurality of sets, each of which including one or more candidates for a resource for an uplink (UL) control channel during initial access, and receiving dynamic signaling indicating any of the one or more candidates for the resource, the one or more candidates being included in the set indicated by the higher layer signaling; and transmitting a UL control signal, using the resource corresponding to the candidate indicated by the dynamic signaling from among the one or more candidates included in the set indicated by the higher layer signaling, in which an association between a value to be indicated by the higher layer signaling and the plurality of sets is configured for each of one or more parameters relating to the initial access.

INDUSTRIAL APPLICABILITY

An aspect of this disclosure is useful in mobile communication systems.

REFERENCE SIGNS LIST

100 Base station
101, 209 Controller
102 Data generator
103, 107, 110, 211 Encoder
104 Retransmission controller
105, 108, 111, 212 Modulator
106 Higher-layer control signal generator
109 DL control signal generator
112, 213 Signal assigner
113, 214 IFFT processor
114, 215 Transmitter
115, 201 Antenna
116, 202 Receiver
117, 203 FFT processor
118, 204 Extractor
119 Demodulator/Decoder
120 Determiner
200 Terminal
205 DL control signal demodulator
206 Higher-layer control signal demodulator
207 DL data signal demodulator
208 Error detector
211 ACK/NACK generator

The invention claimed is:

1. A terminal comprising:
   circuitry, which in operation, determines a physical uplink control channel (PUCCH) resource in a PUCCH resource set provided by cell specific information that is used to configure cell specific PUCCH parameters for an initial access; and
   a transmitter, which in operation, transmits acknowledgement (ACK) information using the PUCCH resource during the initial access,
   wherein the circuitry, in operation, determines the PUCCH resource based on a value of a PUCCH resource indicator included in downlink control information (DCI), and
   wherein a number of PUCCH resources in the PUCCH resource set is larger than 2 to a power of a number of bits of the PUCCH resource indicator.

2. The terminal according to claim 1, wherein the cell specific PUCCH parameters include a number of symbols, and responsive to determining that the PUCCH resource set uses PUCCH format 0, the number of symbols is set to 2.

3. The terminal according to claim 1, wherein the cell specific PUCCH parameters include a first symbol, and the first symbol is limited to one or more defined values.

4. The terminal according to claim 1, wherein the cell specific PUCCH parameters include a first symbol, and responsive to determining that the PUCCH resource set uses PUCCH format 0, the first symbol is set to 12.

5. The terminal according to claim 1, wherein the cell specific PUCCH parameters include a number of symbols, and responsive to determining that the number of symbols is set to 14, the PUCCH resource set uses PUCCH format 1.

6. The terminal according to claim 5, wherein the cell specific PUCCH parameters include a first symbol, and responsive to determining that the number of symbols is set to 14, the first symbol is set to 0.

7. The terminal according to claim 1, wherein the cell specific PUCCH parameters include a number of symbols, and responsive to determining that the number of symbols is set to 10, the PUCCH resource set uses PUCCH format 1.

8. The terminal according to claim 1, wherein the circuitry, in operation, determines the PUCCH resource before a PUCCH resource configuration information in a radio resource control (RRC) signaling is indicated.

9. The terminal according to claim 8, wherein the transmitter always transmits the ACK information using frequency hopping before the PUCCH resource configuration information is indicated.

10. The terminal according to claim 9, wherein a frequency hopping pattern of the frequency hopping is a mirroring pattern as an axis is a center of a frequency band used in a previous uplink transmission during the initial access.

11. The terminal according to claim 1, wherein a number of bits of the cell specific information is 4, and the cell specific information indicates one of 16 PUCCH resource sets.

12. The terminal according to claim 11, wherein an association between the bits of the cell specific information and one of the 16 PUCCH resource sets is differentiated depending on a resource used by message 3 during the initial access.

13. The terminal according to claim 1, wherein the cell specific PUCCH parameters further include a frequency position and cyclic shift information.

14. The terminal according to claim 1, wherein the PUCCH resource set includes a plurality of PUCCH resources, and each of the plurality of PUCCH resources is corresponding to the cell specific PUCCH parameters.

15. The terminal according to claim 1, wherein the circuitry, in operation, determines the PUCCH resource based on control channel element (CCE) information of the DCI.

16. A communication method comprising:
   determining a physical uplink control channel (PUCCH) resource in a PUCCH resource set provided by cell specific information that is used to configure cell specific PUCCH parameters for an initial access, wherein the PUCCH resource is determined based on a value of a PUCCH resource indicator included in downlink control information (DCI), and a number of PUCCH resources in the PUCCH resource set is larger than 2 to a power of a number of bits of the PUCCH resource indicator; and
   transmitting acknowledgement (ACK) information using the PUCCH resource.

* * * * *